United States Patent
Lindbo et al.

(10) Patent No.: US 12,116,203 B2
(45) Date of Patent: Oct. 15, 2024

(54) SYSTEM AND METHOD FOR PICKING ITEMS

(71) Applicant: Ocado Innovation Limited, Herts (GB)

(72) Inventors: Lars Sverker Ture Lindbo, Herts (GB); Andrew John Ingram-Tedd, Herts (GB)

(73) Assignee: OCADO INNOVATION LIMITED, Herts (GB)

( * ) Notice: Subject to any disclaimer, the term of this patent is extended or adjusted under 35 U.S.C. 154(b) by 0 days.

(21) Appl. No.: 18/471,409

(22) Filed: Sep. 21, 2023

(65) Prior Publication Data

US 2024/0010423 A1 Jan. 11, 2024

Related U.S. Application Data

(63) Continuation of application No. 16/964,011, filed as application No. PCT/EP2019/051528 on Jan. 22, 2019, now Pat. No. 11,794,994.

(30) Foreign Application Priority Data

Jan. 22, 2018 (GB) ..................................... 1800961
Jan. 25, 2018 (GB) ..................................... 1801263

(51) Int. Cl.
*B65G 1/04* (2006.01)
*B65G 1/137* (2006.01)

(52) U.S. Cl.
CPC ......... *B65G 1/0414* (2013.01); *B65G 1/0464* (2013.01); *B65G 1/0478* (2013.01); *B65G 1/0485* (2013.01); *B65G 1/1373* (2013.01)

(58) Field of Classification Search
CPC ................ B65G 1/0414; B65G 1/0464; B65G 1/0478; B65G 1/0485; B65G 1/1373
See application file for complete search history.

(56) References Cited

U.S. PATENT DOCUMENTS

| | | | |
|---|---|---|---|
| 9,334,116 | B2 | 5/2016 | Dewitt et al. |
| 9,815,625 | B2 | 11/2017 | Dewitt et al. |
| 10,029,851 | B1 | 7/2018 | Durham et al. |
| 10,071,857 | B2 | 9/2018 | Dewitt et al. |
| 10,703,566 | B2 | 7/2020 | Dewitt et al. |

(Continued)

FOREIGN PATENT DOCUMENTS

| | | |
|---|---|---|
| CN | 106575391 A | 4/2017 |
| CN | 107922115 A | 4/2018 |

(Continued)

OTHER PUBLICATIONS

Office Action (Examination Report No. 2) issued on Dec. 19, 2023, by the Australian Patent Office in corresponding Australian Patent Application No. 2021282526. (5 pages).
Office Action issued on Dec. 8, 2023, by the Korean Patent Office in corresponding Korean Patent Application No. 10-2022-7029802, and an English Translation of the Office Action. (10 pages).
First Office Action issued on Aug. 8, 2023, by the Japanese Patent Office in corresponding Japanese Patent Application No. 2021-171619, and an English Translation of the Office Action. (4 pages).

(Continued)

*Primary Examiner* — Saul Rodriguez
*Assistant Examiner* — Ashley K Romano
(74) *Attorney, Agent, or Firm* — Buchanan Ingersoll & Rooney PC

(57) ABSTRACT

A system and method for picking items is disclosed. The system includes a grid-based storage area and an order assembly area. The system includes an array of presentation positions, the presentation positions being configured and adapted so as to present storage containers delivered to the presentation positions so as to enable picking of items contained therein.

21 Claims, 14 Drawing Sheets

(56) References Cited

U.S. PATENT DOCUMENTS

| | | |
|---|---|---|
| 10,822,166 B2 | 11/2020 | Ingram-tedd et al. |
| 11,214,438 B2 | 1/2022 | Dewitt et al. |
| 2008/0047909 A1 | 2/2008 | Hamaji et al. |
| 2014/0031972 A1 | 1/2014 | Dewitt et al. |
| 2016/0221757 A1 | 8/2016 | Dewitt et al. |
| 2017/0129703 A1 | 5/2017 | Lindbo et al. |
| 2017/0140327 A1 | 5/2017 | Lindbo |
| 2017/0260008 A1 | 9/2017 | Dewitt et al. |
| 2017/0313514 A1 | 11/2017 | Lert et al. |
| 2017/0369246 A1 | 12/2017 | Dewitt et al. |
| 2018/0155129 A1 | 6/2018 | Lagziel et al. |
| 2018/0162639 A1 | 6/2018 | Ingram-tedd et al. |
| 2018/0265298 A1 | 9/2018 | Wagner et al. |
| 2018/0346247 A1 | 12/2018 | Dewitt et al. |
| 2019/0050795 A1 | 2/2019 | Pankratov et al. |
| 2020/0317447 A1 | 10/2020 | Dewitt et al. |
| 2020/0407160 A1 | 12/2020 | Ingram-tedd et al. |
| 2021/0032026 A1 | 2/2021 | Lindbo et al. |

FOREIGN PATENT DOCUMENTS

| | | |
|---|---|---|
| EP | 3030504 B1 | 2/2018 |
| GB | 2528573 A | 1/2016 |
| GB | 2524383 B | 1/2017 |
| JP | S63154509 U | 10/1988 |
| JP | H05278808 A | 10/1993 |
| JP | 2007210773 A | 8/2007 |
| JP | 2008050064 A | 3/2008 |
| JP | 2015522492 A | 8/2015 |
| JP | 2017522245 A | 8/2017 |
| NO | 317366 B1 | 10/2004 |
| WO | 2010135756 A1 | 12/2010 |
| WO | 2012103566 A1 | 8/2012 |
| WO | 2016198467 A1 | 12/2016 |
| WO | 2017123678 A1 | 7/2017 |
| WO | 2017192783 A1 | 11/2017 |
| WO | 2017211596 A1 | 12/2017 |
| WO | 2017211640 A1 | 12/2017 |

OTHER PUBLICATIONS

International Search Report (PCT/ISA/210) mailed on Apr. 24, 2019, by the European Patent Office as the International Searching Authority for International Application No. PCT/EP2019/051528.

Office Action (Communication) issued on Feb. 22, 2023, by the European Patent Office in corresponding European Patent Application No. 19 701 348.5. (5 pages).

Office Action (Examination Report No. 1) issued on Feb. 6, 2023, by the Australian Patent Office in corresponding Australian Patent Application No. 2021282526. (3 pages).

Office Action (Notice of Reasons for Refusal) issued Mar. 7, 2023, by the Japan Patent Office in corresponding Japanese Patent Application No. 2021-171619 and an English translation of the Office Action. (9 pages).

Office Action (Notification of Reason for Refusal) issued on Jan. 10, 2022, by the Korean Patent Office in corresponding Korean Patent Application No. 10-2020-7023898, and an English Translation of the Office Action. (17 pages).

Office Action (Request for the Submission of an Opinion) issued on Jun. 12, 2023, by the Korean Patent Office in corresponding Korean Patent Application No. 10-2022-7029802, and an English Translation of the Office Action. (6 pages).

Office Action issued Feb. 23, 2023, by the State Intellectual Property Office of People's Republic of China in corresponding Chinese Patent Application No. 201980009439.1 and an English translation of the Office Action. (26 pages).

Office Action issued Jan. 26, 2023, by the Canadian Intellectual Property Office in corresponding Canadian Patent Application No. 3,086,314. (3 pages).

Office Action issued on Aug. 6, 2021, by the Canadian Patent Office in corresponding Canadian Patent Application No. 3,086,314. (4 pages).

Third Office Action issued on Jul. 14, 2022, by the Chinese Patent Office in corresponding Chinese Patent Application No. 201980009439. 1, and an English Translation of the Office Action. (19 pages).

Written Opinion (PCT/ISA/237) mailed on Apr. 24, 2019, by the European Patent Office as the International Searching Authority for International Application No. PCT/EP2019/051528.

2019209922 , "Office Action (Examination report No. 1 for standard patent application)", , 4 pages.

SYSTEM AND METHOD FOR PICKING ITEMS

The present invention relates to a system and method for picking items from a storage system. More specifically but not exclusively, it relates to a system and method for picking items to fulfil customer orders in an online retailing environment, said order picking system comprising item presentation systems and devices.

Some commercial and industrial activities require systems that enable the storage and retrieval of a large number of different stock items.

In one known form of fulfilment centre, as shown in FIG. 1, fulfilment systems referred to as 'zone pick' or 'pick and pass' are used. In such systems, items and stock required to fulfil customer orders are located in storage bins or containers, the storage bins or containers being arranged along aisles. On the opposite side of the aisle from the storage bins or containers, a conveyor system is located, the conveyor system carrying customer delivery bins or containers. The conveyor system is arranged so as to pass a proportion of the delivery bins or containers moving on the backline conveyor through pick stations, via station conveyors, where items ordered by a customer are transferred by an operative from a storage bin or container to a customer delivery bin or container. When a customer delivery container is located at a picking station on the conveyor system, it is paused and an operator selects a required item from a storage bin or container and places it in the customer delivery bin or container.

It will be appreciated that in certain market sectors such as online grocery retailing, this known form of operation may require many pick aisles, many pick stations and many operators to fulfil customer orders and hence requires a large initial expenditure. Furthermore, expansion of such systems is difficult as the infrastructure design and location is fixed from the outset.

In a further known type of system for the storage and retrieval of items of multiple product lines, the items are again located in storage bins or containers. However, in the alternative known system the bins or containers are arranged in stacks on top of one another, the stacks being arranged in rows. The storage bins or containers are accessed from above and removed from the stacks by load handling devices.

EP 3030504 B1 (Ocado Innovation Limited) the content of which is incorporated herein by reference, describes a robotic picking system in which stacks of containers are arranged within a frame structure. A system of this type is illustrated schematically in FIGS. 5 and 6 of the accompanying drawings. The robotic load handling devices are controllably moved around on a system of tracks, the tracks forming a grid located above the stacks of containers. In the robotic picking system described in EP3030504 B1, the grid comprises a series of grid spaces defined by the tracks, each stack of containers being located within the footprint of a single grid space. In use, the robotic load handlers run on the tracks above the stacks and are controllably positioned above a predetermined stack of containers. Once in position, a lifting mechanism is lowered, a part of which, a gripper device, engages with a container and lifts said bin or container from the stack in to a cavity within the load handling device. In this particular system the cross-section of the robotic load handling device substantially conforms to the area of a single grid space. Furthermore, the tracks and robotic load handling devices are configured such that two load handling devices may occupy adjacent grid spaces and pass each other in either direction when in operation.

Other forms of robotic load handling device are described in, for example, Norwegian patent number NO 317366 B1 (Autostore AS), the content of which is incorporated herein by reference, in which cantilever-type load handling devices disclosed occupy two grid spaces when in operation. It will be appreciated that in the context of the invention described in more detail below with reference to the specific embodiments any form or configuration of load handling device may be used in place of the two examples described above.

Such storage systems remove the need for aisles between the storage and picking areas and also allow a higher density of storage of products or items in the fulfilment centre for a given volume.

In the known, grid-based, robotic picking systems described above, the storage bin or container being lifted from a stack may contain inventory items needed to fulfil a customer order. Once lifted by the load handling device, the storage bin or container is delivered by the load handling device to an output port above or adjacent a pick station or to the pick station per se. At the pick station, the required inventory item or items may be manually or robotically removed from the storage bin or container and placed in a delivery container, the delivery container forming part of the customer order, and being filled for dispatch at the appropriate time.

It will be appreciated that such an order may comprise a plurality of delivery containers, the number of delivery containers required being defined by the number of items or products ordered. Accordingly, a large number of containers or bins may need to be moved from storage positions within stacks to the pick stations.

Advantageously, the modular nature of grid-based picking systems enables an overall picking and storage system to be built in stages and expanded as required, thereby spreading out capital expenditure and costs as necessary.

However, it will be appreciated that moving storage bins or containers to a pick station and subsequently picking inventory items from said storage bins or containers, whether manually or robotically, in to delivery bins or containers can sometimes be delayed. Such delays at pick stations may cause load handling device congestion at the output ports of the system or at the pick stations and can cause delays in the assembly and hence dispatch of customer orders.

This is a disadvantage of such systems that each inventory item must be delivered in a storage bin or container to a pick station as required, there is no ability to keep frequently required items at the pick stations.

Additionally, the number of pick stations in a grid-based system is limited by the space available for the footprint of the pick stations. As a result of this, frequently required items and products need to be transported many times by the robotic load handlers, thereby increasing the load handler movements required and further congestion at output ports.

Furthermore, such grid-based systems require all inventory items to be placed in to storage bins or containers in order to be available to pick. This limits the systems to inventory items that can be placed in containers or bins and requires an additional unpacking step to be performed as part of the picking system or method.

It will be appreciated that both the types of known storage and picking systems described above, are operated under the control of computer utilities acting so as to control the movement and location of storage bins or containers and delivery containers, the movement and location of stock, and the location and number of operatives required at any given point in the system. Additionally, in a grid-based system the computer utilities control the movement and location of the load handling devices and may control the communication between the load handling devices and the order picking system.

Given the known systems described above, especially where labour is relatively inexpensive and where there is a concentration of frequently ordered or "fast moving" items, it may be beneficial to combine a grid-based storage and picking system with a conventional 'zone pick' or 'pick and pass' conveyor based picking system.

According to the invention there is provided a system for picking items from storage, the system comprising a grid-based storage system, the storage system comprising a series of storage containers, the storage containers comprising items to be stored, the storage containers being located in stacks within a framework, in which a portion of the framework comprises an output column, said output column being provided with a plurality of presentation positions, the storage containers being movable from storage positions within the stacks to said presentation positons remote from the stacks via the output column, said presentation positions being arranged so as locate a plurality of storage containers on at least one face of the storage system, the presentation positions being arranged such that the items stored in said storage containers are accessible to an item picker.

According to the invention there is further provided a method of picking items from a storage system using such a picking system.

In this way, the present invention overcomes the problems of the prior art and provides a system and method of increasing the speed at which customer orders can be compiled whilst reducing the overall cost and improving the efficiency of customer fulfilment centres or other industrial scenarios where items are stored and access to said items is regularly required.

The invention will now be described with reference to the accompanying diagrammatic drawings in which:

FIG. 1 is a schematic, perspective view of one known form of 'zone pick' or 'pick and pass' picking system, showing a pick aisle, a storage area and two order assembly areas, the storage area further comprising storage bins or containers positioned so as to present a pick face to an operative, the storage bins or containers comprising items, products or inventory awaiting assimilation in to customer orders;

Figure 5:
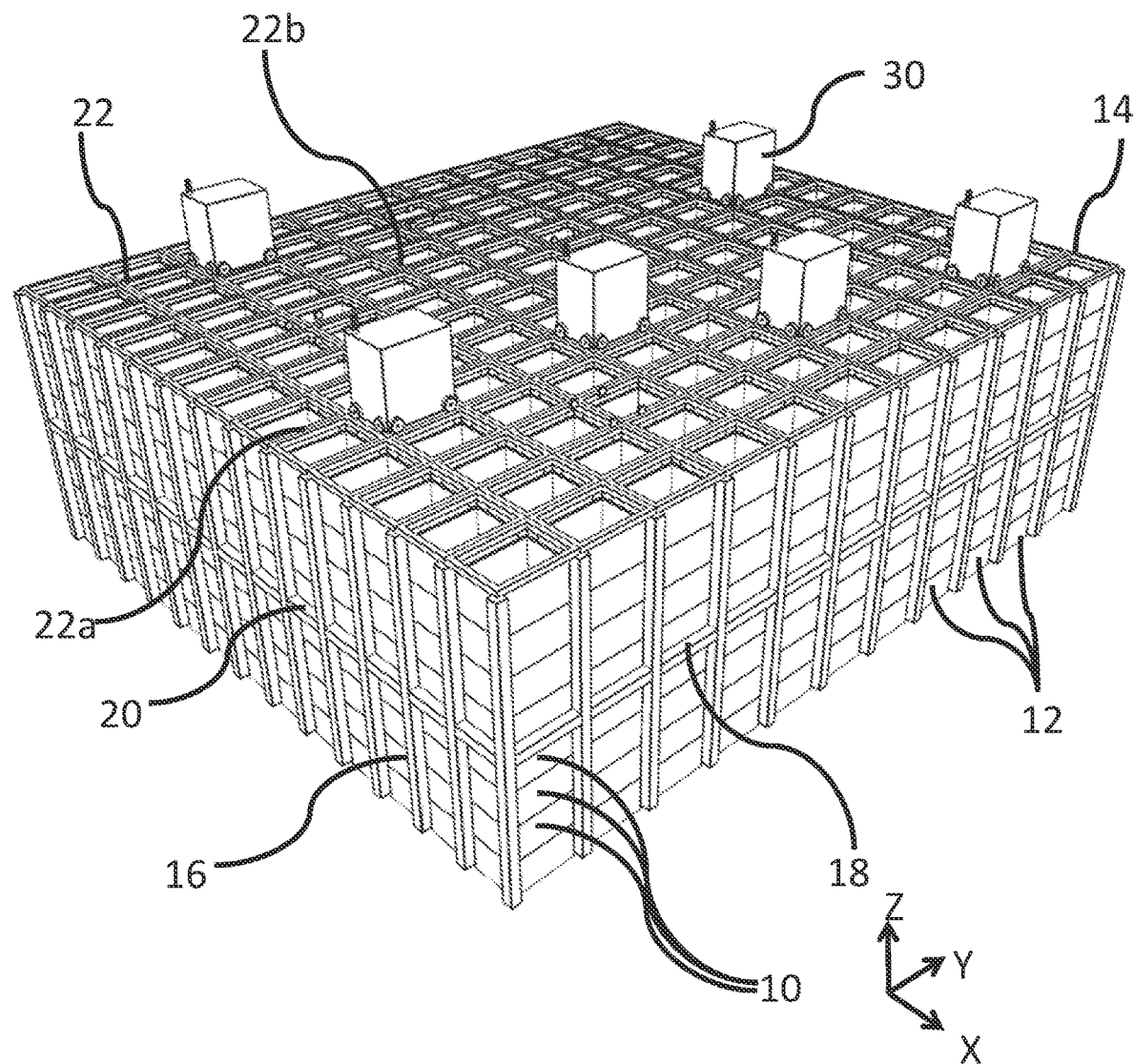
FIG. 5 is a schematic, perspective view of one form of grid-based robotic picking system, the system comprising a grid located above stacks of storage bins or bins, a series of tracks disposed on the grid, the tracks carrying load handling devices, the load handling devices adapted to pick up containers or bins from the stacks beneath the grid.
Figure 6:
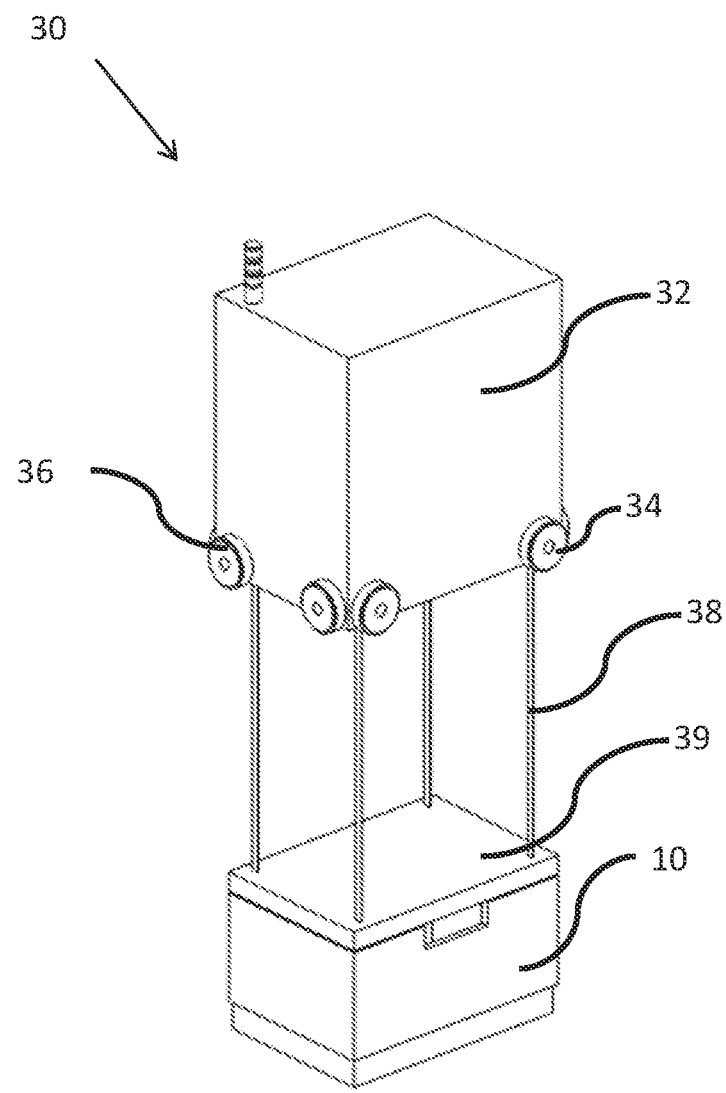
FIG. 6 is a schematic perspective views of one form of known robotic load handling device for use with the grid-based storage area of the zone pick solution of FIG. 5.
Figure 7A:
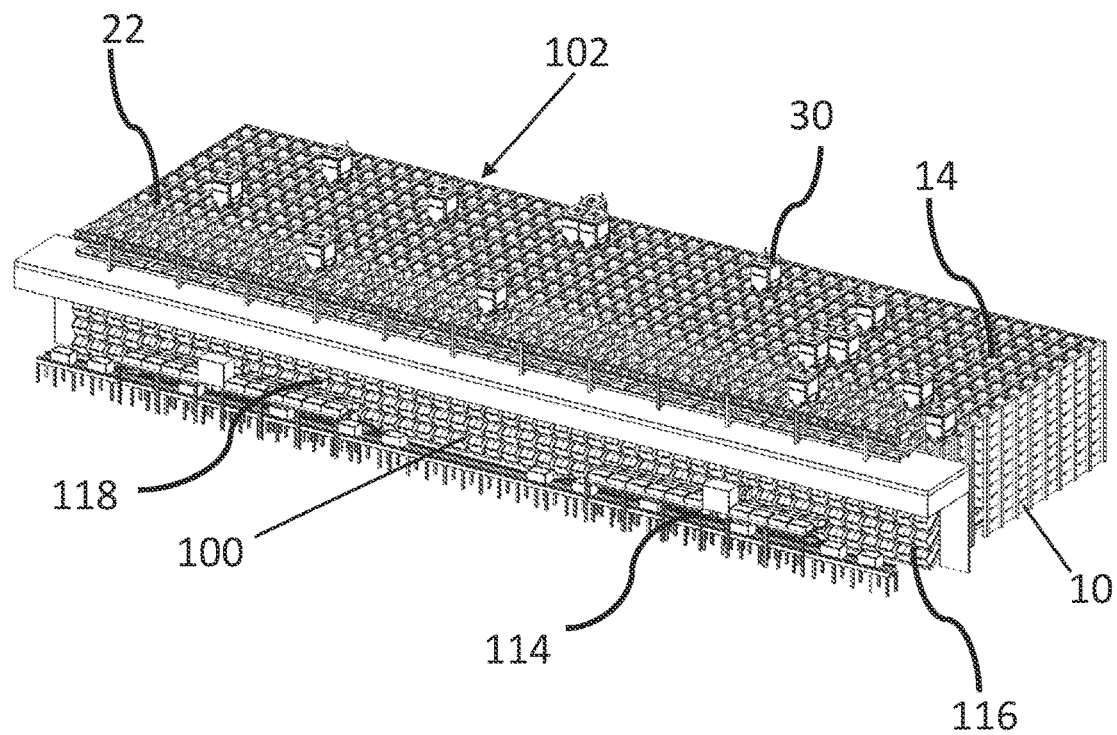
Figure 7B:
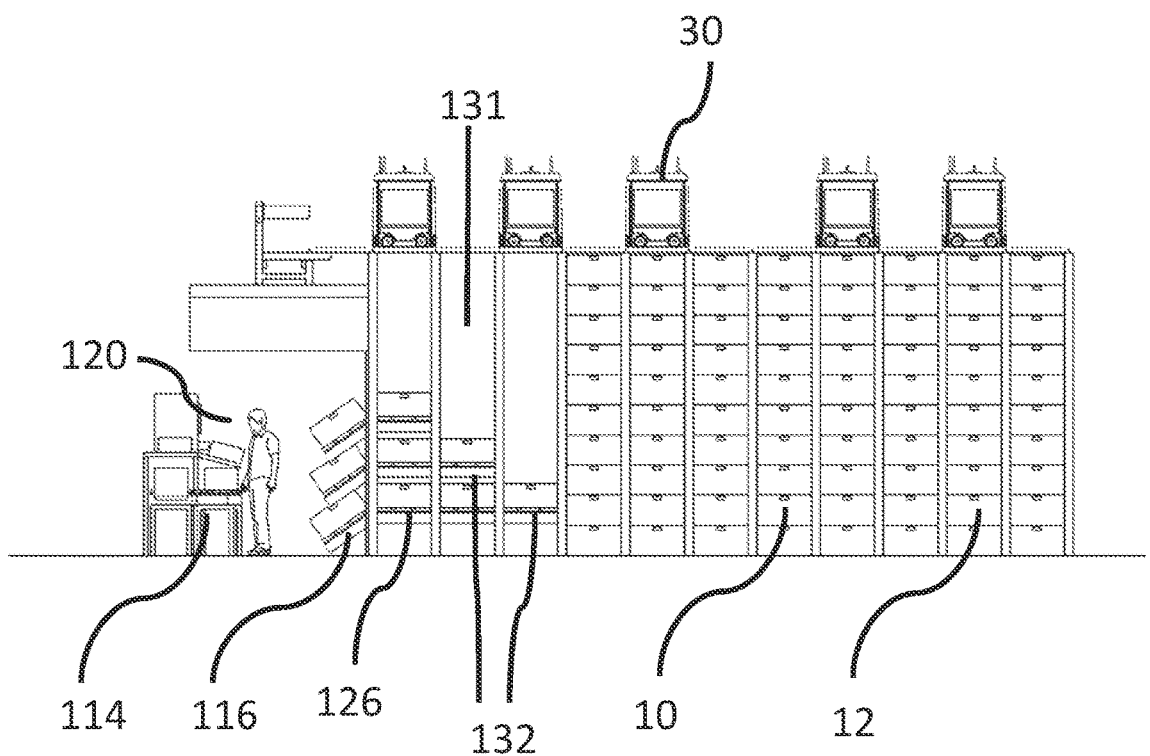
Figure 7C:
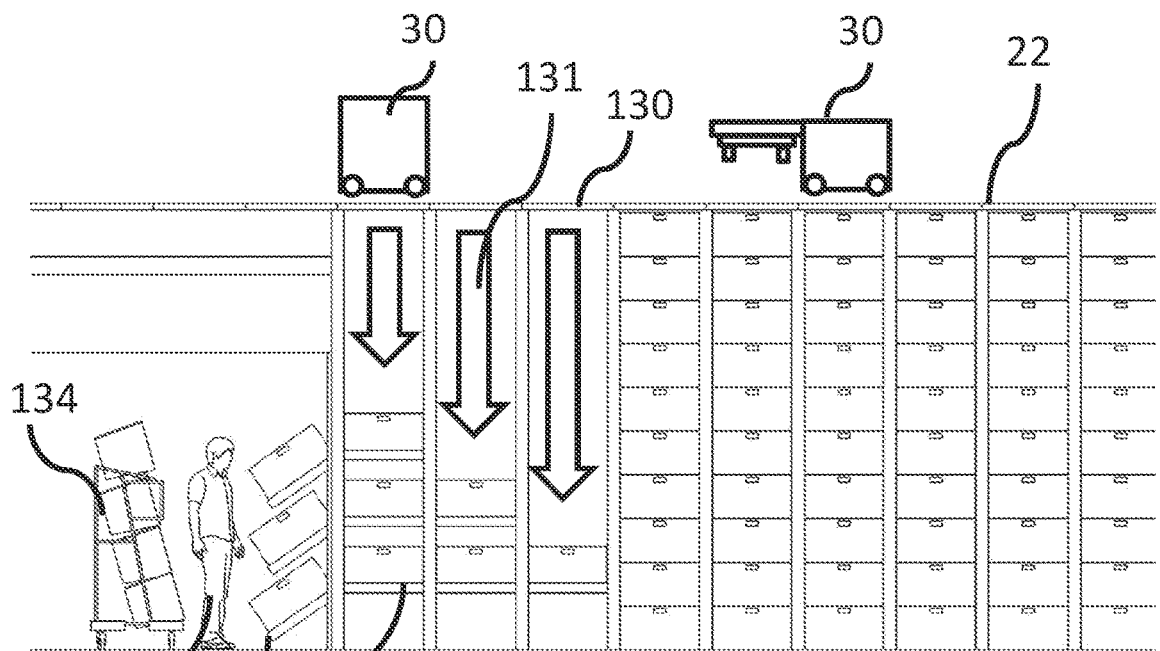
Figure 8A:
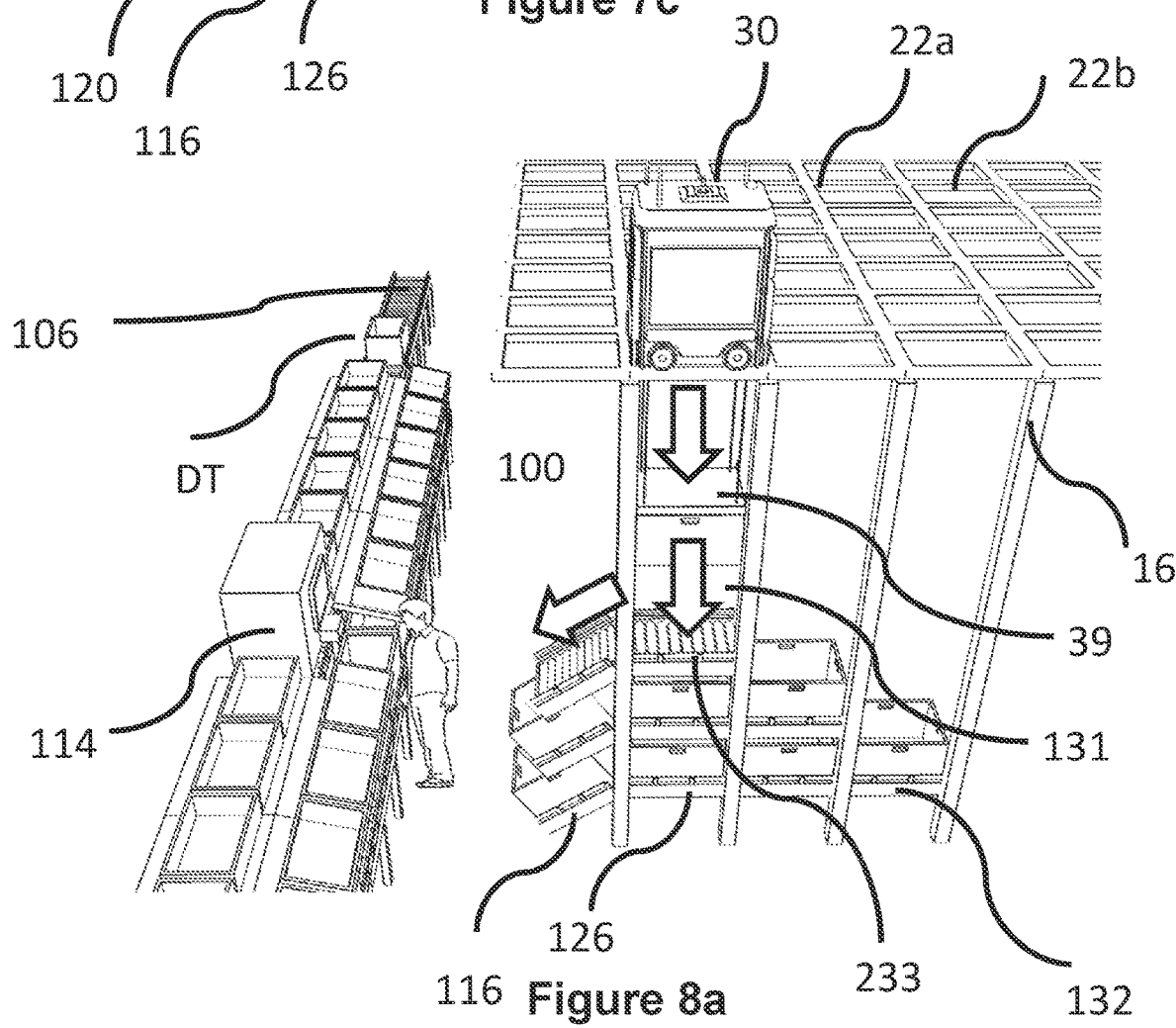
Figure 8C:
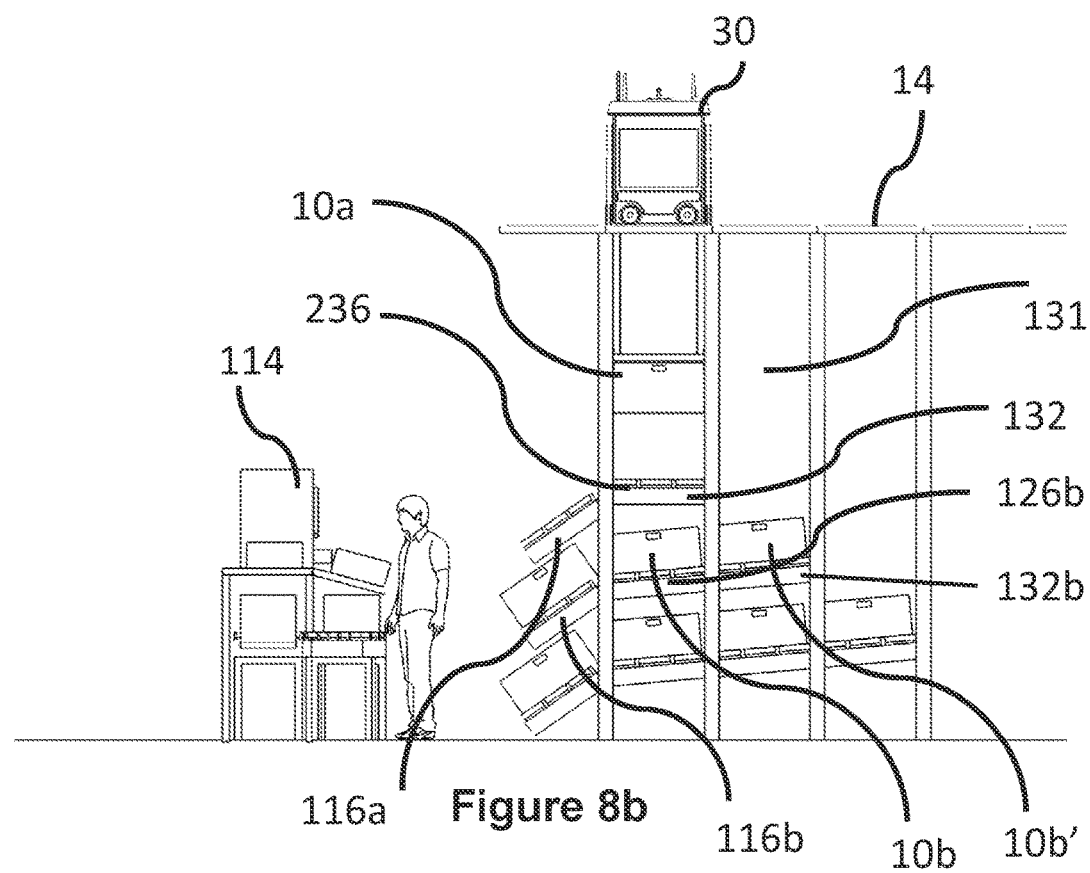
Figure 8C:
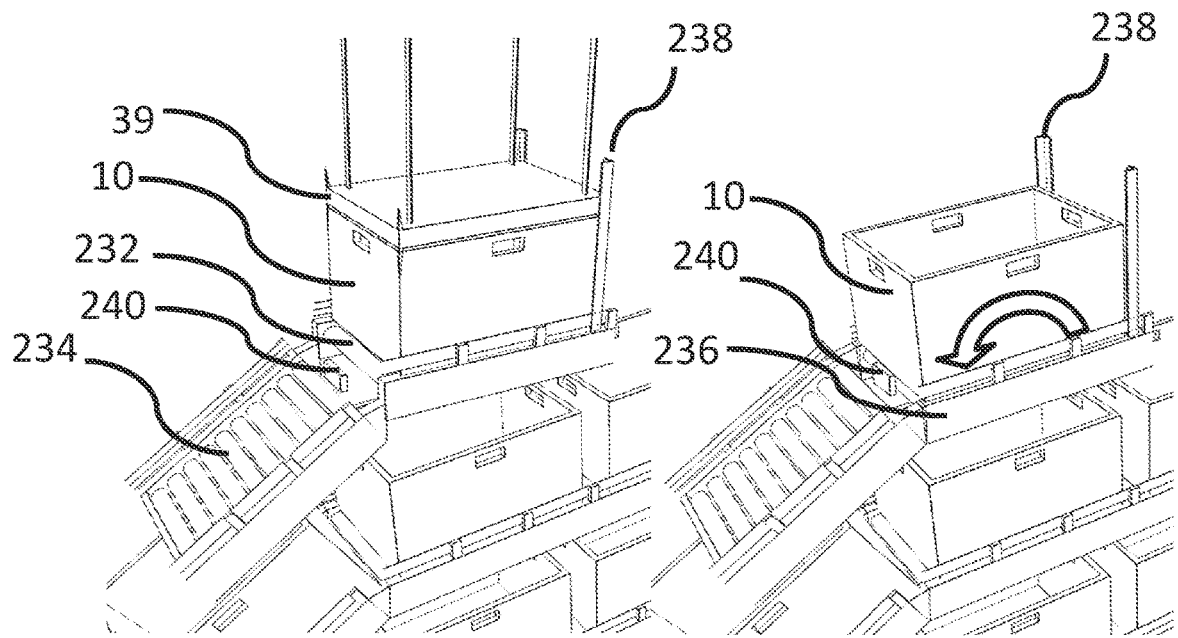
Figure 8D:
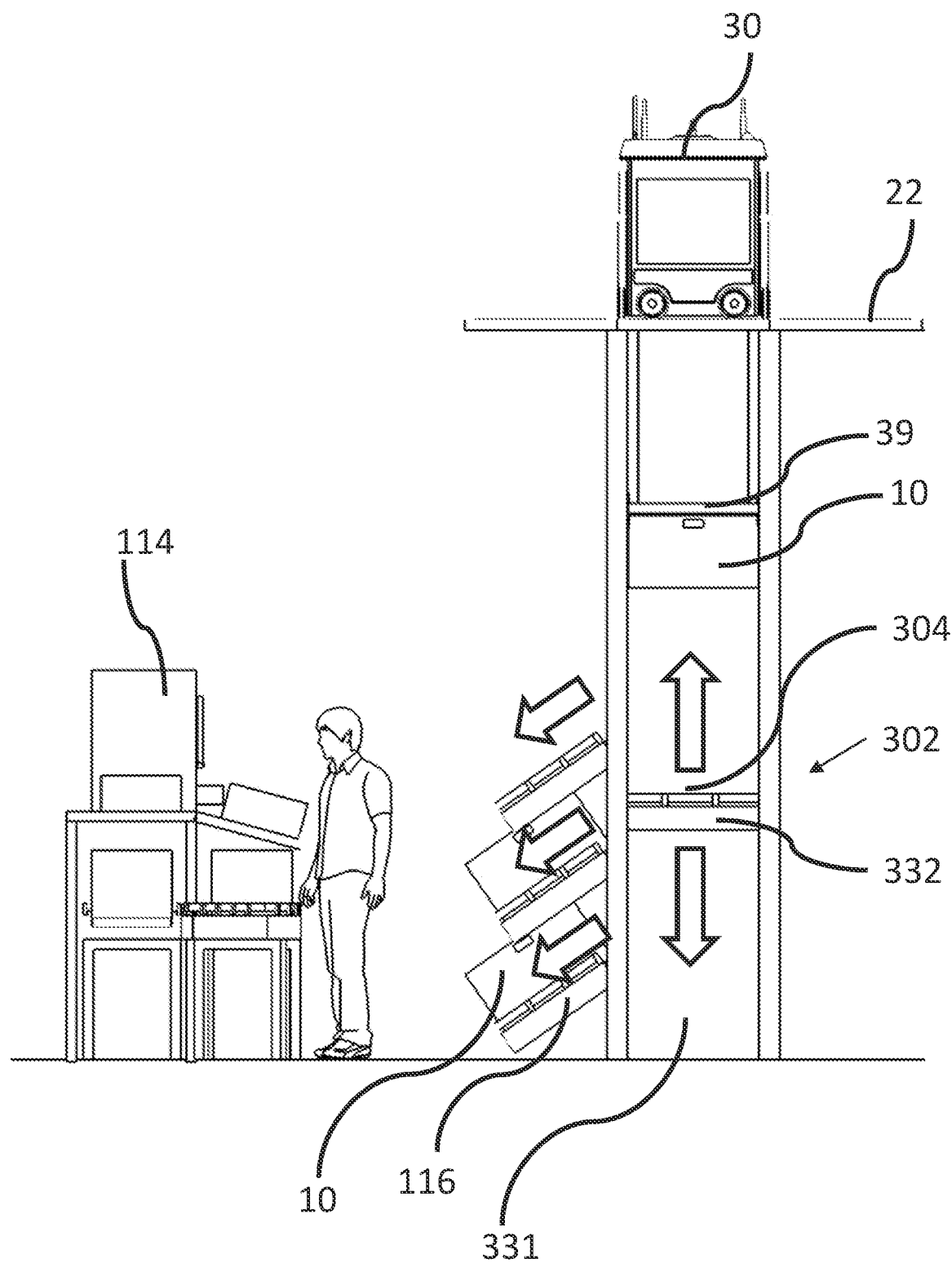
Figure 8E:
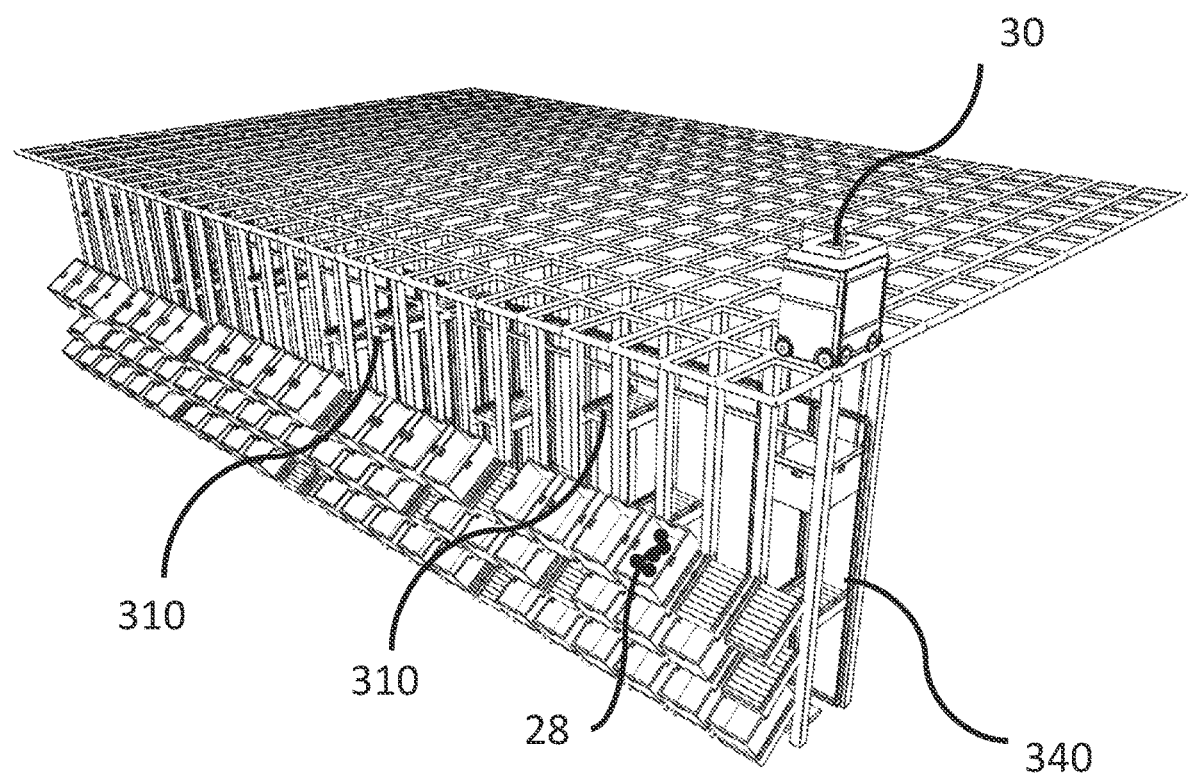
Figure 8F:
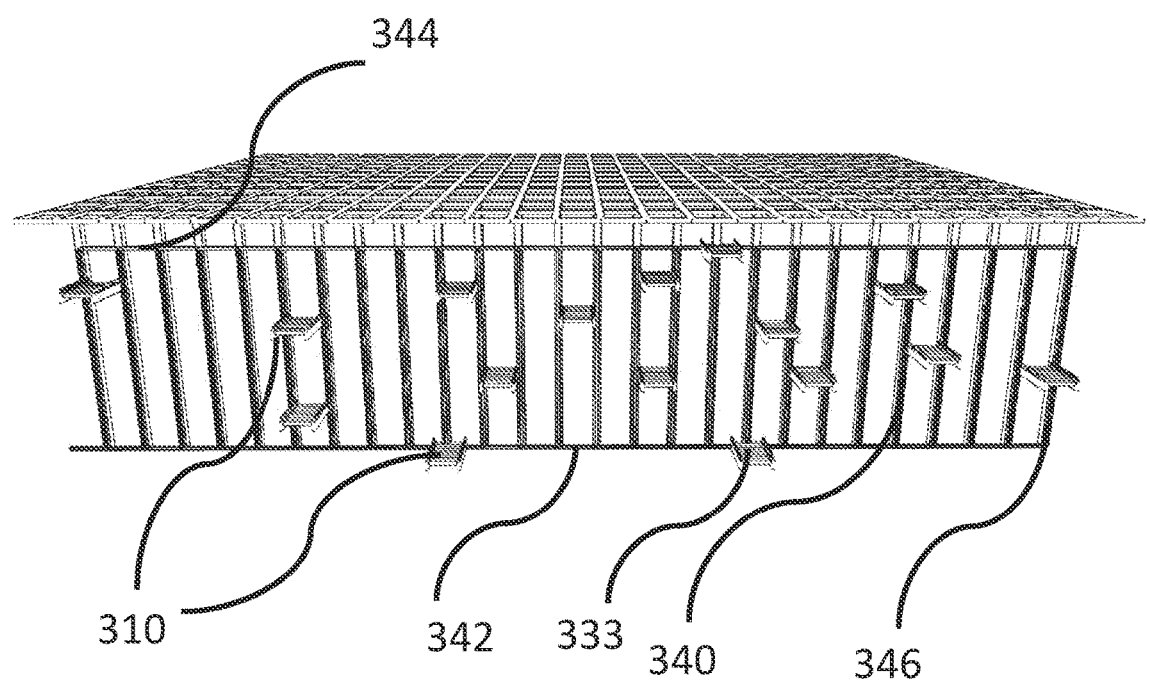
Figure 8G:
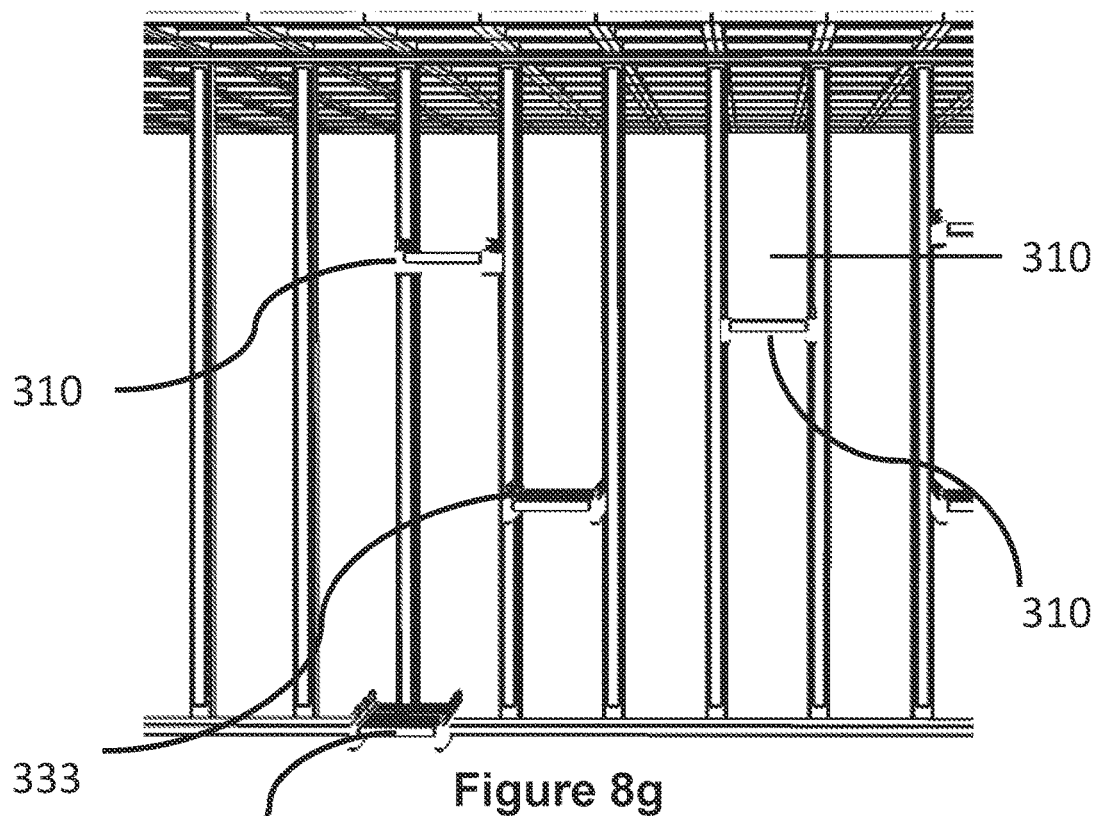
Figure 8H:
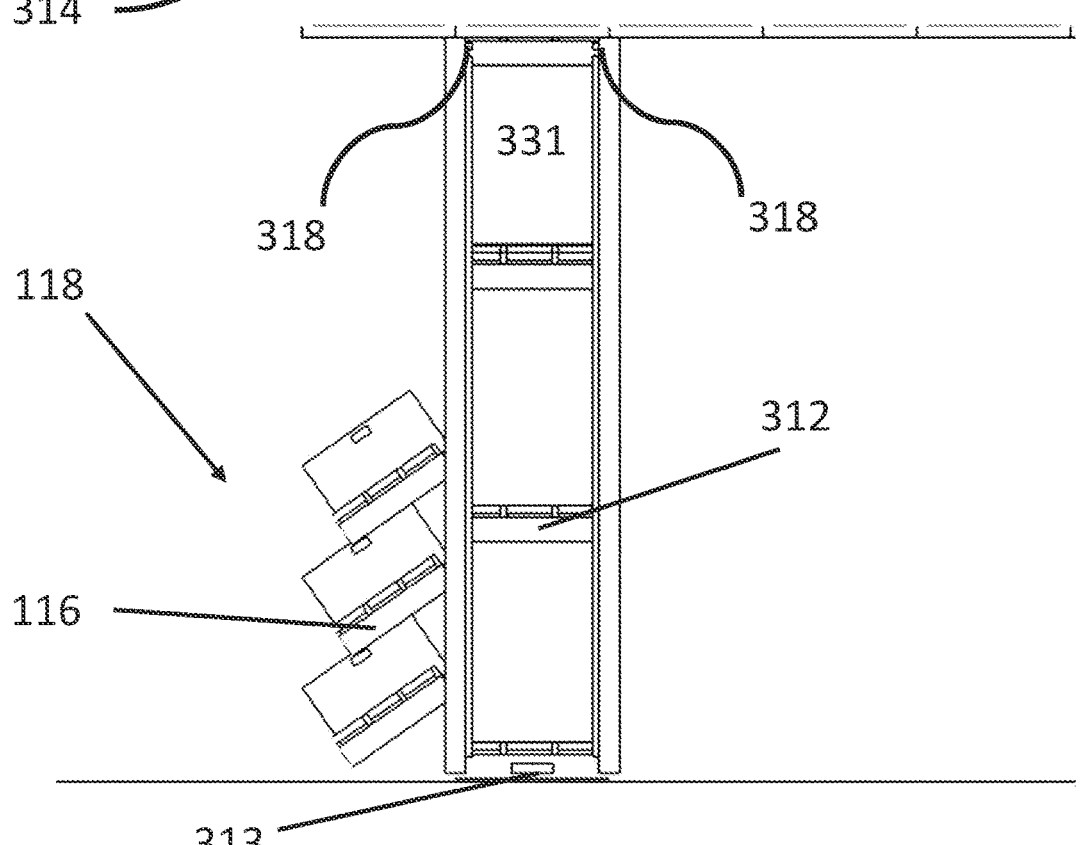
Figure 9:
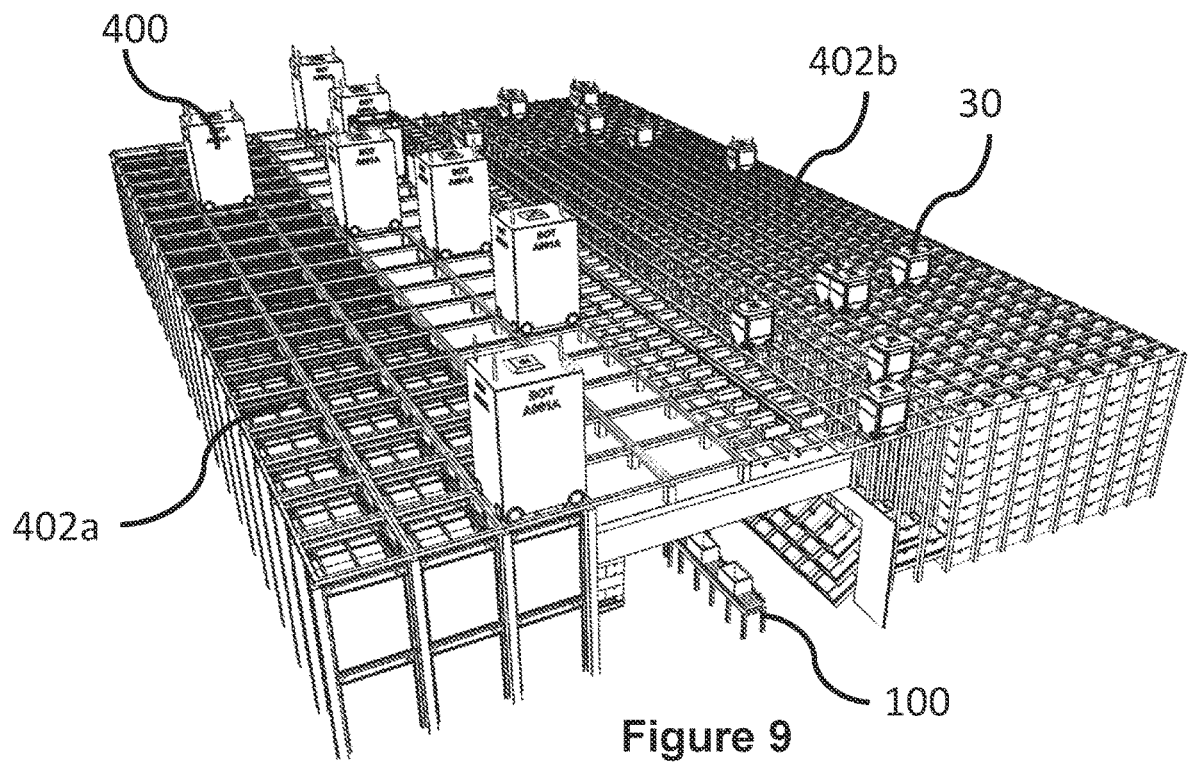
Figure 10:
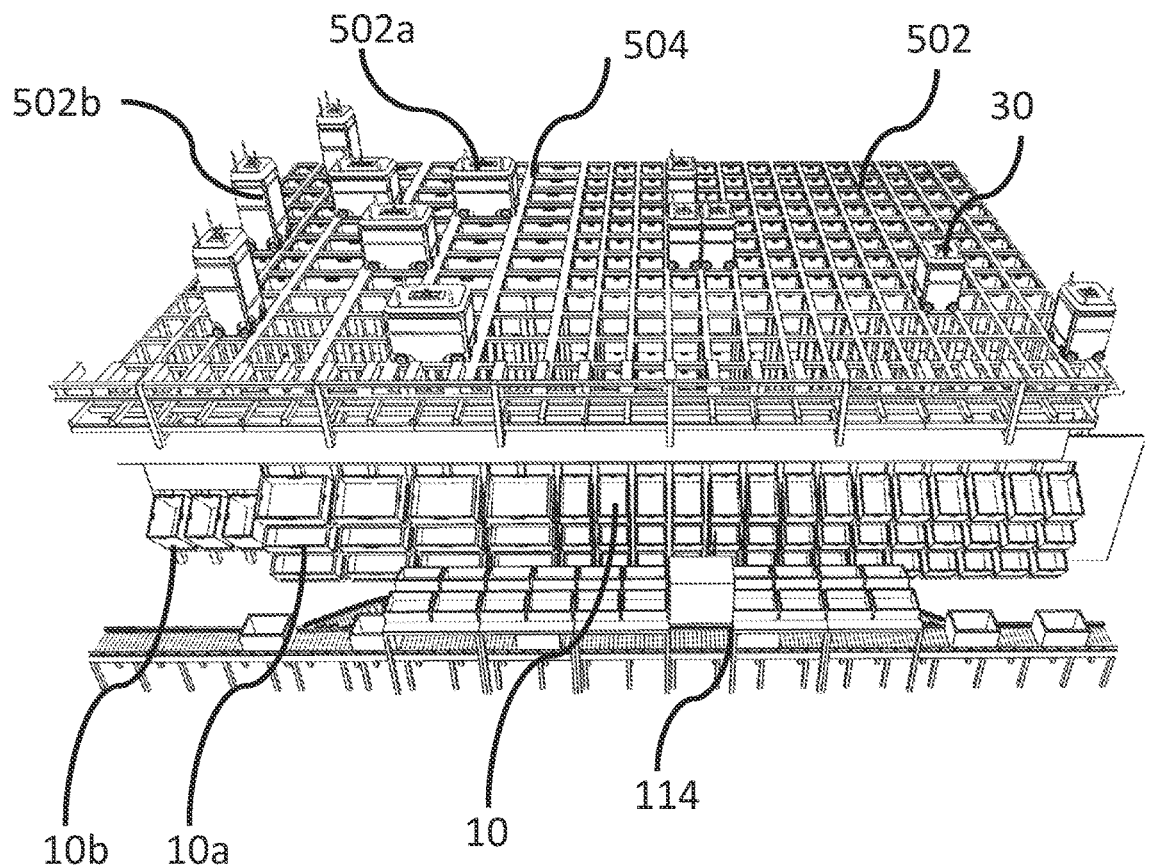
Figure 11:
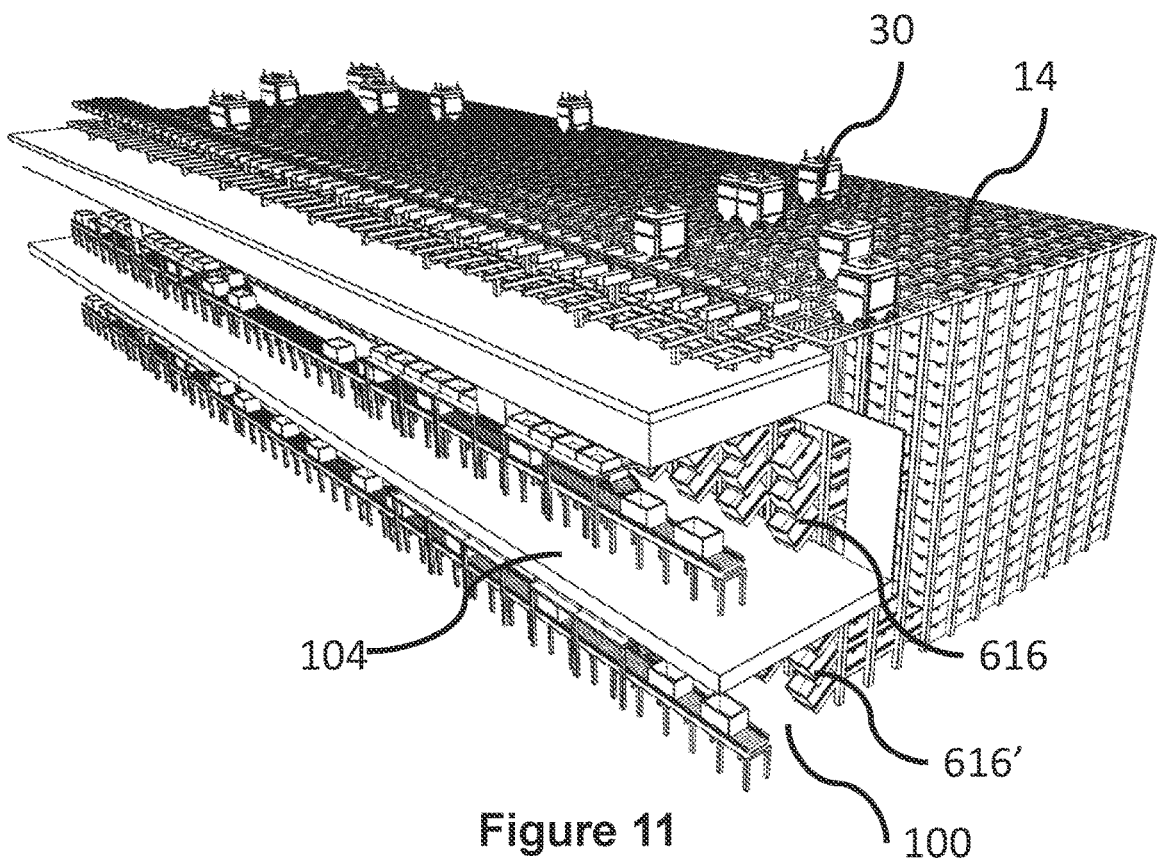
Figure 12:
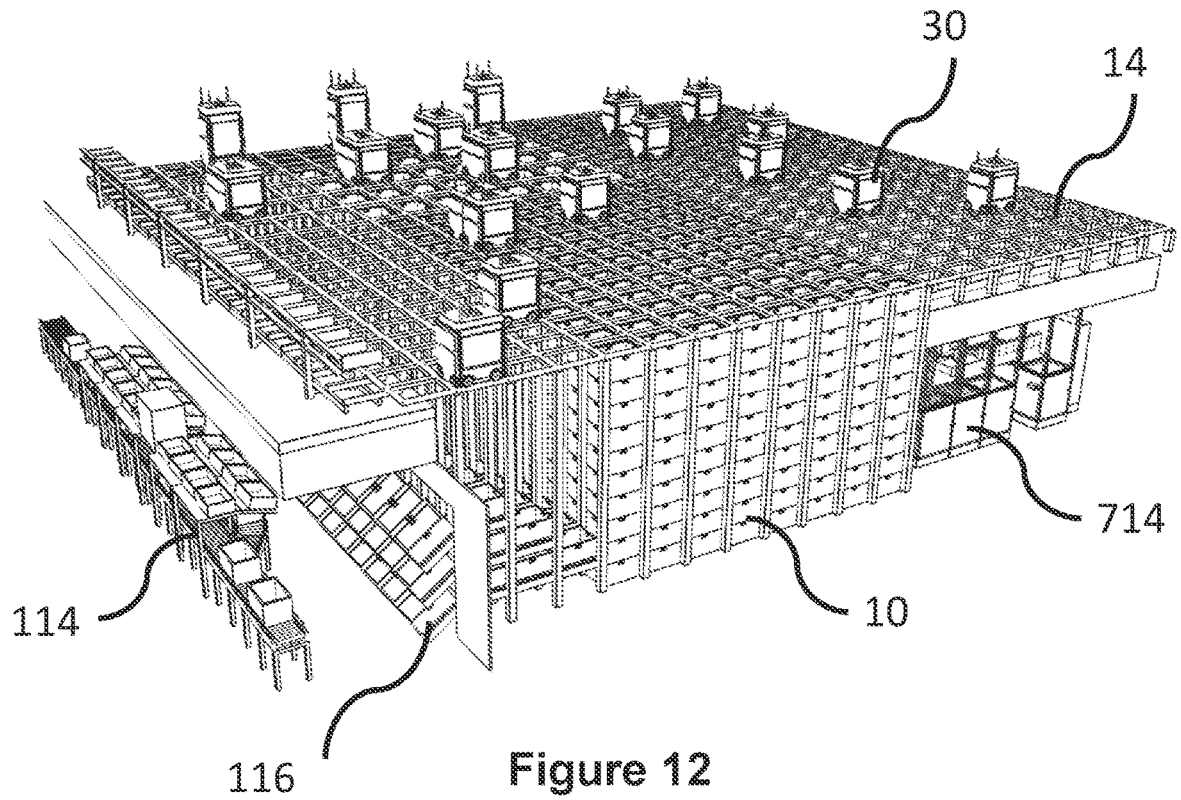
Figure 13:
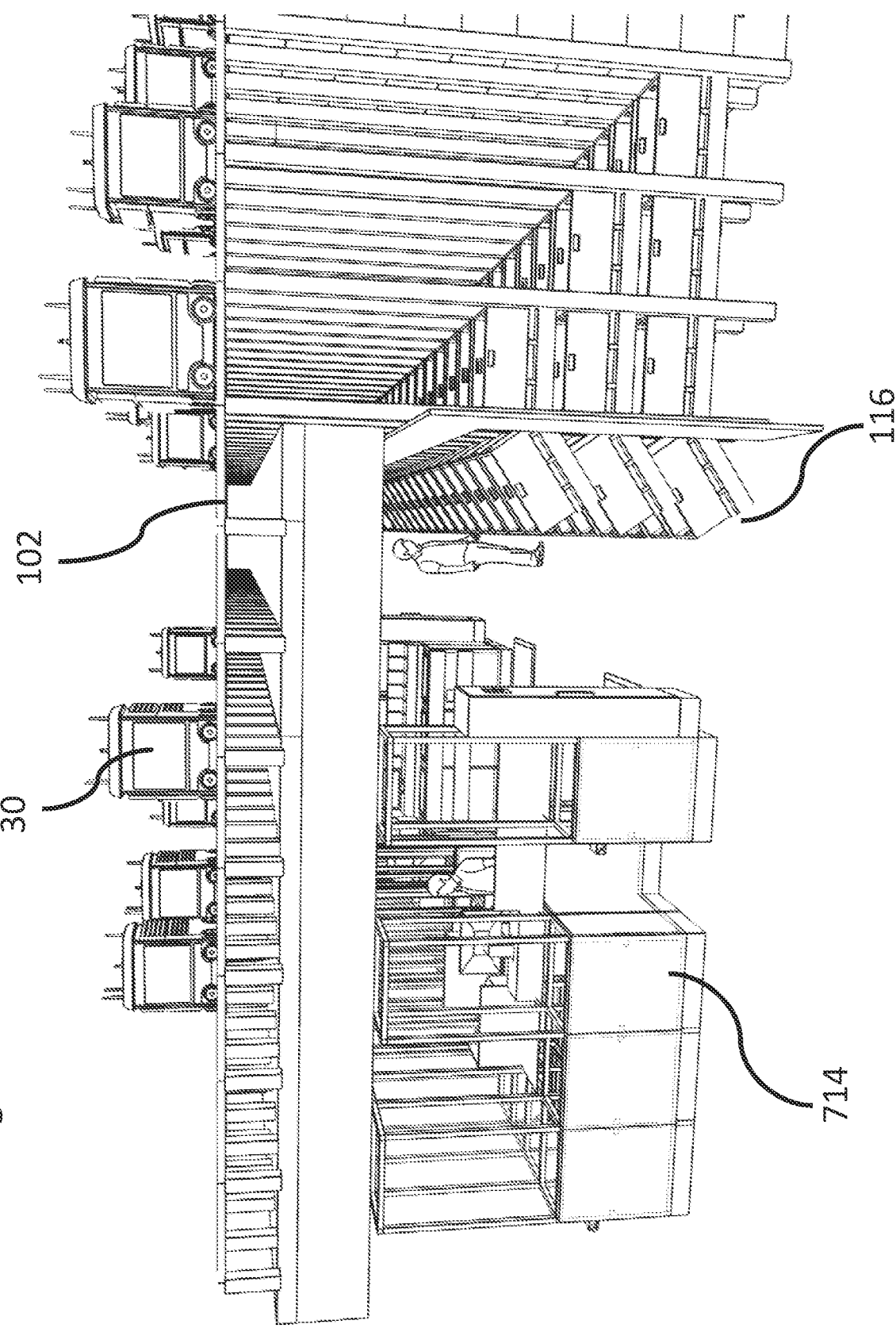

FIG. 7a is a schematic, perspective view of an order picking system in accordance with one form of the invention, the system comprising a storage area comprising a grid-based storage solution, the grid-based solution comprising a robotic picking system, the system housing a plurality of stacks of storage bins or containers in the storage area, the grid based system comprising an array of storage bin presentation positions;

FIG. 7b is a schematic, side view of the order picking system of FIG. 7a in accordance with one form of the invention, the system comprising a plurality of load handling devices of the type shown in FIG. 6, installed on the frame structure of FIG. 5, together with at least one robotic load handling device, the framework and the load handling device together comprising the main components of a robotic storage and picking system for storage and handling of items to be stored;

FIG. 7c is a schematic, side view of one form of the order picking system of FIG. 7a in accordance with the invention, showing pre-pick positions and presentation positions in the storage area, the system further comprising one mechanism for transferring storage containers or bins from the pre-pick positions to the presentation positions, the order assembly portion comprising a trolley pick system;

FIG. 8a is a schematic, perspective view of a part of the presentation portion of the storage system of the order picking system in accordance with one form of the invention, in which containers from the grid-based storage system are delivered to the storage area by robotic load handling devices;

FIG. 8b is a schematic, side view of the presentation portion of FIG. 8a showing a further form of mechanism for moving storage bins of bins from delivered locations to presentation positions;

FIG. 8c is a schematic, perspective view of the system of FIG. 8b showing the mechanism for moving the storage containers in more detail;

FIG. 8d is a schematic, side view of a further form of storage area of an order picking system in accordance with one form of the invention, the system comprising a bin lift device for transferring the storage containers or bins to the presentation positions;

FIG. 8e is a schematic, perspective view of a further form of the storage area of the order picking system in accordance with one form of the invention, the storage area comprising a series of shuttle devices operable on a frame comprising a looped track for transferring the storage containers or bins to the presentation positions;

FIG. 8f is a schematic, cutaway perspective view of the order picking system of FIG. 8e, showing in more detail the shuttle devices of FIG. 8e operable on the looped track;

FIG. 8g is a schematic, perspective view of a further form of the storage area of the order picking system in accordance with one form of the invention, the storage area comprising a series of shuttle devices operable on a track system, the shuttles being engageable with the uprights of the framework of the grid-based storage system;

FIG. 8h is a schematic side view of the further form of the storage area of the order picking system of FIG. 8g, showing the shuttle devices in position within the uprights of the framework;

FIG. 9 is a schematic, perspective view of a further form of order picking system in accordance with the invention, the order picking system comprising a further storage area comprising a grid-based storage area adapted for use with larger storage bins or pallets;

FIG. 10 is a schematic, perspective view of a further form of the invention, the order picking system comprising a storage area having presentation positions of differing sizes, the grid-based storage system comprising portions sized so as to accept storage bins or containers of predetermined but varying sizes;

FIG. 11 is a schematic, perspective view of a further form of the invention, the grid-based storage area being associated with a zone pick systems on multiple levels in a CFC environment;

FIG. 12 is a schematic perspective view of a further form of the invention showing a complete Customer Fulfilment Centre (CFC), the CFC comprising a grid-based storage system having a zone pick order picking system on one face, the remaining grid-based system comprising pick stations and peripherals adapted so as to function in said grid-based system; and FIG. 13 is a schematic view of a further form of order picking system in accordance with one form of the invention, the system comprising two forms of pick station in close proximity.

In the description below, 'storage bins 10' will be used to denote containers, bins or totes intended for the storage of inventory items, whilst 'delivery containers DT' will be used to denote containers, bins or totes intended to be filled to fulfil orders placed by customers, in an online retail environment or otherwise. It will be appreciated that this terminology is used for ease of reference and explanation within this document. However, it should be noted that the storage bins 10 and the delivery containers DT may be of the same shape and configuration. Furthermore, delivery containers DT may be stored in bins 10 within the storage system or any part thereof. It is the function of the bin, container or tote that defines the category of container rather than any change in the actual size, shape, or configuration.

In one form of order picking system described below with reference to FIGS. 1 to 4, many pick aisles 100 may be arranged in a large warehouse environment often referred to as a Customer Fulfilment Centre (CFC) but for ease of the present description, a single pick aisle 100 is described below and illustrated in FIGS. 1 to 4. It will be appreciated that the number of pick aisles 100 is limited only by the size of the warehouse building or CFC and that pick aisles 100 can be arranged over many floors and in many different formats and arrangements. One example of pick aisle 100 described below is of a typical form but is described for example only and should not be considered limiting.

Figure 1:
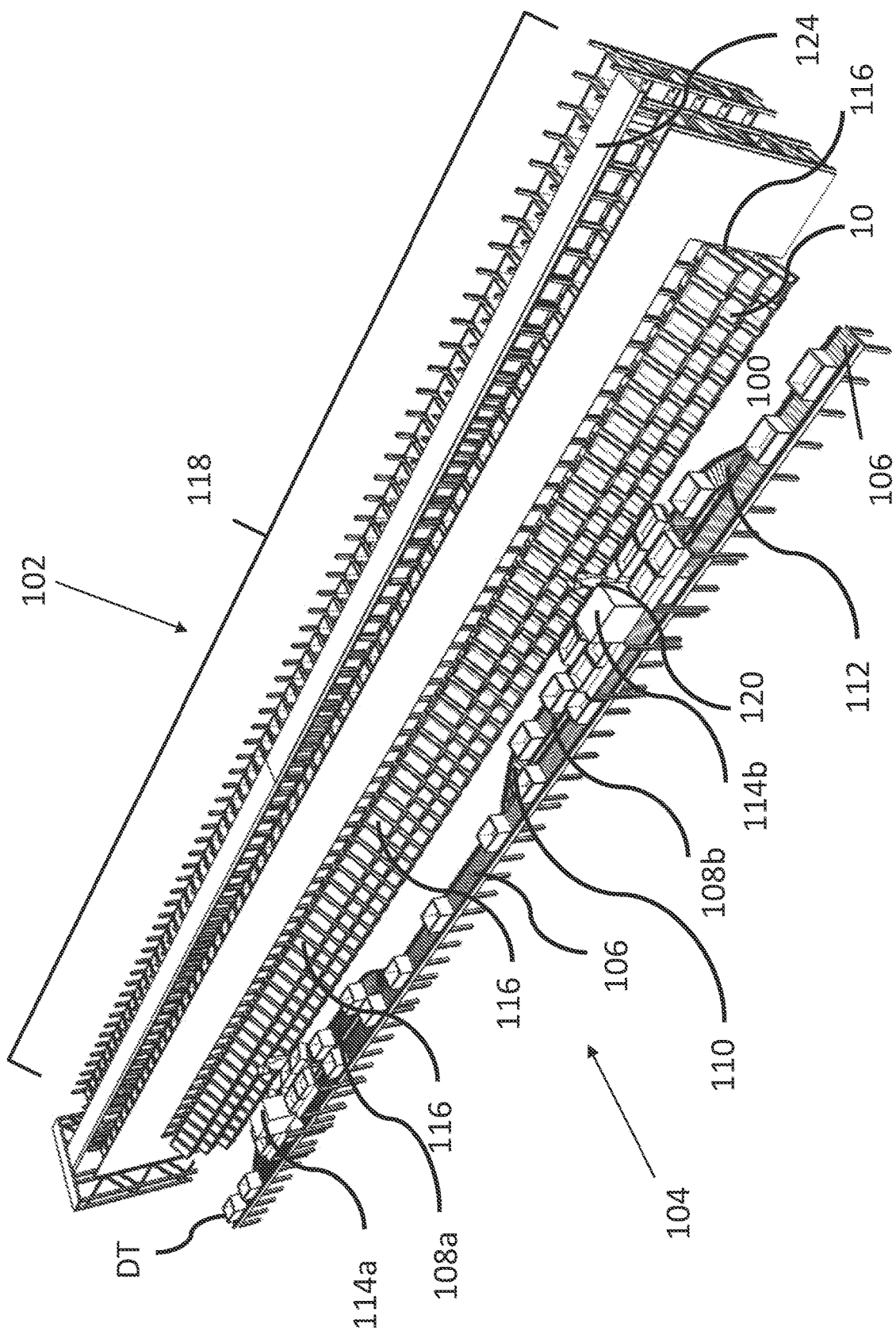
Figure 2:
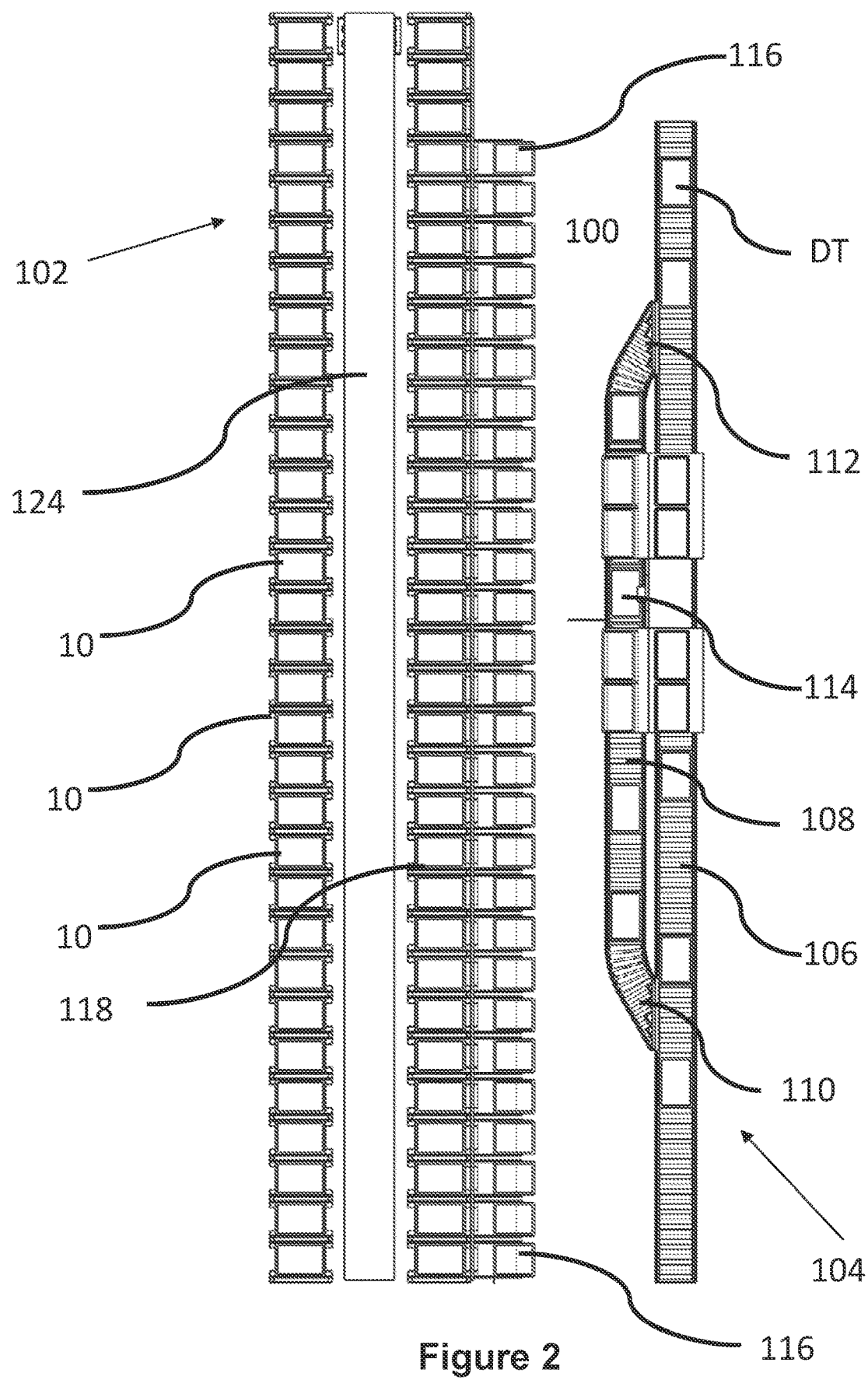
FIG. 2 is a schematic, plan view of the system of FIG. 1 showing the storage area, the pick face and an example of one order assembly area in more detail, the pick aisle comprising a backline conveyor and portions of station conveyor.

As shown in FIG. 1, one form of zone pick fulfilment system comprises a pick aisle 100, the pick aisle 100 being bounded on one side by a product or item storage area 102 and being bounded on the other side by an order assembly area 104. Both the order assembly area 104 and the storage area 102 extend substantially along the length of the pick aisle 100, on both sides.

The order assembly area 104 comprises two parallel conveyors or portions of conveyor 106, 108 running along the pick aisle 100, a first 'backline' conveyor 106 and a second 'station' conveyor segments 108a and 108b. The backline conveyor 106 is linked to the station conveyor portions 108a and 108b by a series of diverts 110 and merges 112.

The pick aisle 100 further comprises a series of pick stations 114 positioned at intervals along the length of the pick aisle 100, the pick stations 114 being located such that the station conveyor portions 108a and 108b run through the pick stations 114a and 114b.

The storage area 102 of the pick aisle 100 comprises a series of storage bin or container 10 presentation positions 116 which, when populated with bins or containers 10 or other forms of product, inventory or items in or on suitable storage receptacles, create a 'pick face' 118 extending along the length of the pick aisle 100. The pick face 118 comprises multiple layers of storage bins or bins 10 positioned so as to present items to be picked (not shown) to operatives 120 present in the pick aisle 100.

In use, delivery containers DT are moved around the CFC to have inventory items or products, previously ordered by a customer as part of an order, placed therein. In the case of a given delivery container DT, this enters the pick aisle 100 described above as the control utility (not shown) has routed the said delivery container DT to that aisle 100 as the storage area 102 of the particular pick aisle 100 comprises an item required for the given customer order and the given delivery container DT. It will be appreciated that delivery containers DT may be routed through every pick aisle in a CFC or infrastructure or conveyor connections may exist within the CFC that enables delivery containers DT to only be routed through pick aisles 100 in which an item is to be picked therein.

As the delivery container DT passes along the backline conveyor 106, it may be diverted via the divert 110 to the station conveyor 108a if the storage area 102 in the region of the pick station 114a comprises a product or item required in the given customer order associated with the give delivery container DT. If the storage area 102 in the region of the pick station 114a does not comprise a required item or product for that given delivery container DT, the delivery container DT will bypass the pick station 114a by continuing along the backline conveyor 106.

On arrival at the pick station 114a, the delivery container DT comes to a controlled stop under the control of the computer control utility (not shown). Whilst held at the pick station 114a, an operative 120 will pick the required inventory item or product from an identified storage container or bin 10 located in the storage area 102 in to the delivery container DT.

The storage bin 10 will be identified by any suitable method. For example, a light may be activated at the appropriate presentation position 116. Alternatively a display at the pick station 114 may provide location information.

Once the required item is picked in to the delivery container DT, the delivery container DT is moved on automatically under the control of the computer control utility (not shown) via the station conveyor portion 108a and the merge 112 on to the backline conveyor 106. The delivery container DT will then continue on a journey around the CFC and be routed by the computer control utility (not shown) to the required pick stations 114 in any pick aisle 100 within the CFC.

It will be appreciated that the above is one form of zone pick system and there are many variations and modifications to the above system that are possible. For example, delivery containers DT may be manually pushed to and from the backline conveyor 106 or moved between pick stations 114 manually.

In another example, no separate backline conveyor 106 is provided, so all delivery containers DT pass along station conveyors 108 only and therefore pass through all pick stations 114. Furthermore, delivery containers DT may be automatically stopped at pick stations 114 or may continue moving there through, the operative picking items thereto whilst the delivery container DT is moving. Additionally, it will be appreciated that it is possible for delivery containers DT to bypass complete pick aisles 100 and only be routed through aisles 100 where there are items required to be picked into the relevant delivery container DT.

In one further example, the conveyor systems 106, 108 are completely replaced by a manual system of trolleys pushed around the CFC environment by operatives who move along the pick face 118 to the required storage locations 116, guided by computer devices displaying item locations under the control of the computer control utility. The computer devices may be handheld or may be trolley mounted.

Figure 3:
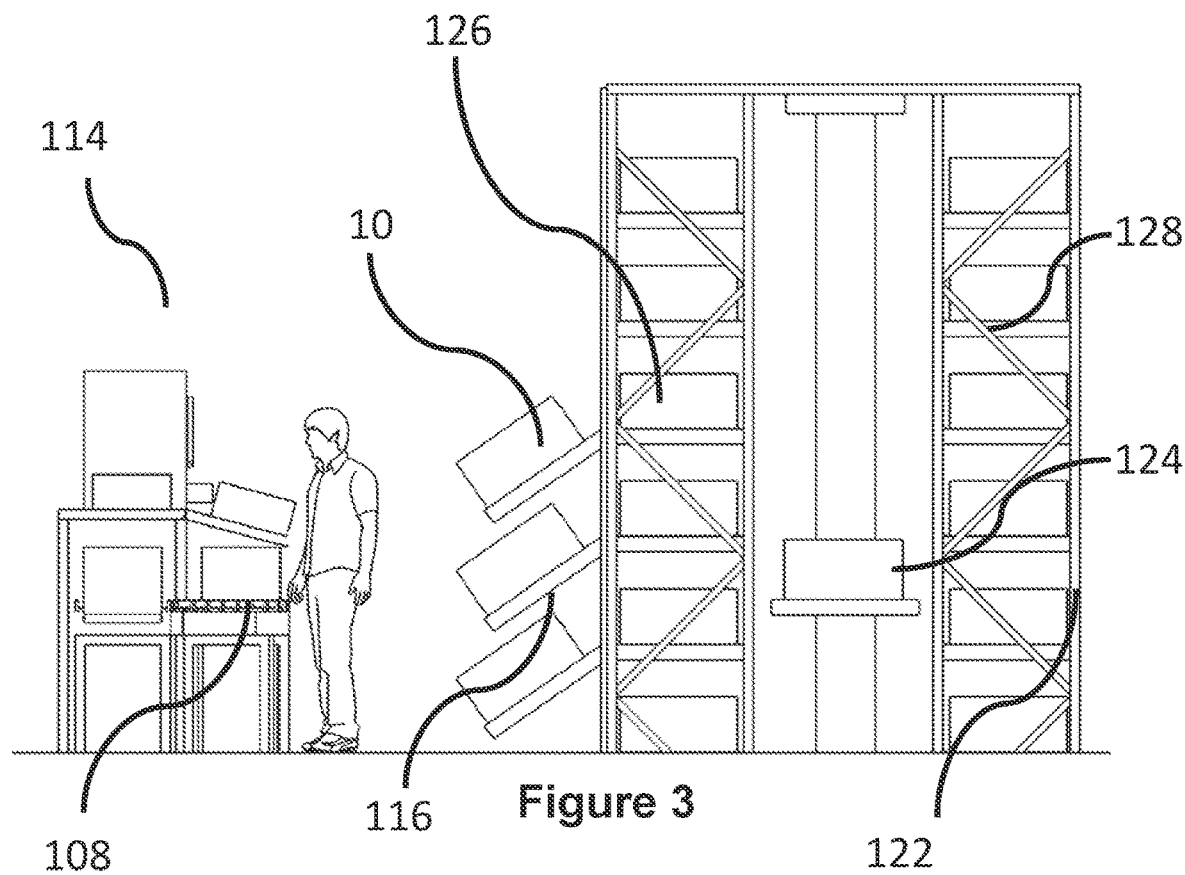
FIG. 3 is a schematic, cross-sectional view of the order assembly area of FIG. 1, through the pick aisle in the region of the pick station.
Figure 4:
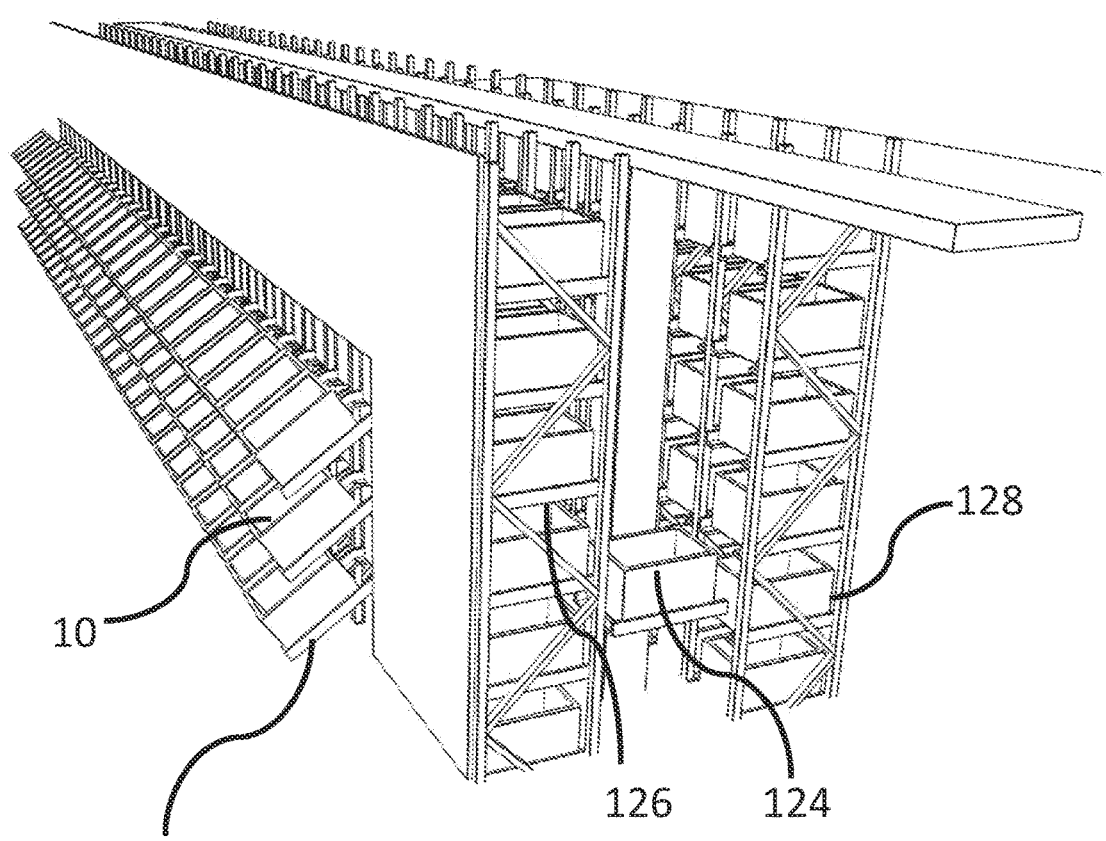
FIG. 4 is a schematic, perspective view of a typical form of storage area of the system of FIGS. 1 to 3.

The storage area 102, shown in more detail in FIGS. 3 and 4 comprises a framework 122 onto which storage bins 10 are placed by a crane device 124. The framework comprises the presentation positions 116 in which the storage bins or bins 10 are placed so as to form the pick face 118 along the length of the pick aisle 100. The framework 122 further comprises storage locations 126 (sometimes referred to as pre-pick positions) immediately behind the presentation positions 116 wherein storage bins 10 are located. The storage locations 126 generally comprise storage bins 10 having the same inventory items therein as the storage bins 10 in the presentation positions 116 in the pick face 118. However, this need not be the case.

The remaining storage positions 128 comprise storage bins 10 having other inventory items therein. It will be appreciated that the inventory items are either of the same type as those in the storage bins 10 in the presentation positions 116 and the storage locations 126, in the case of fast moving goods, or other slower moving inventory items that may only be required to replace storage bins 10 in presentation positions 116 less frequently.

In use, once the storage bin 10 in any given presentation position 116 is emptied, for example when the operative 120 picks the final inventory item from the storage bin 10 in the presentation position 116, the operative 120 removes the empty storage bin 10 to an alternative, remote location, and the storage bin 10 located in the pre-pick storage position 126 immediately behind, is moved in to the presentation position 116. The crane device 124 then fills the empty pre-pick storage position 126 with a further storage bin 10 having the required inventory items therein.

It will be appreciated that the storage bins 10 in the pre-pick positions 126 may be moved to the presentation positions 116 either manually, for example, by the operative 120 pulling the storage container 10, or automatically by a conveyor, either driven or operating under gravity. It will be appreciated that there are many ways of moving the storage bins 10 from the pre-pick positions 126 to the presentation positions 116. It will also be appreciated that the storage bins or bins 10 in the pre-pick storage positions 126 may contain the same type of inventory item located in the storage bin 10 in the presentation position 116. However, the computer control utility may determine that for future orders, a storage bin 10 comprising alternative inventory items may be more appropriately positioned in the presentation position 116 and prepare for this in advance by locating the appropriate storage bin 10 in the storage position 126 in advance.

In this way, the items presented to the operative 120 may be dynamically changing over time and may be governed by a knowledge of future orders or other outside influences such as seasonal changes.

It is a disadvantage of the zone pick system described above that, the storage area can be a single point of failure. Should the crane device 124 in any given pick aisle 100 fail, the use of the said pick aisle 100 is affected. This can, for example, limit the use of the pick aisle 100 to only the items remaining in the storage bins 10 already in the pick face 118. Prolonged inaction of the crane device 124 can cause problems for the whole CFC environment and in extreme cases can lead to customer orders being incomplete.

It is a further problem with the storage area of the pick aisle 100 described above, that the velocity of turnover of items and products stored in locations within the storage area 102 needs to be controlled in order to ensure that no one crane device 124 in one pick aisle 100 is overloaded.

In the description that follows, features common to typical systems described above and the embodiments of the invention will be identified using the same reference numerals.

One form of the invention will now be described with reference to FIGS. 5, 6 and 7, stackable storage bins 10, are stacked on top of one another to form stacks 12. The stacks 12 are arranged in a frame structure 14 in a warehousing or manufacturing environment. FIG. 5 is a schematic perspective view of the frame structure 14. Each storage bin 10 typically holds a plurality of product or inventory items 28, and the inventory items within a bin 10 may be identical, or may be of different product types depending on the use to which the pick aisle 100 is put. Furthermore, the storage bins 10 may be physically subdivided to accommodate a plurality of different inventory items 28.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The storage bins 10 are stacked between the members 16, 18, 20 of the frame structure 14, so that the frame structure 14 guards against horizontal movement of the stacks 12 of storage bins 10, and guides vertical movement of the storage bins 10.

The top level of the frame structure 14 includes rails 22 arranged in a grid pattern across the top of the stacks 12. Referring additionally to FIG. 6, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, is arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 is lifted clear of the rails 22, and the second set of wheels 36 is lowered into engagement with the second set of rails 22a. The drive mechanism can then be used to drive the second set of wheels 36 to achieve movement in the Y direction.

In this way, one or more robotic load handling devices 30 can move around the top surface of the stacks 12 on the frame structure 14, as shown in FIG. 4 under the control of a centralised control utility (not shown). Each robotic load handling device 30 is provided with lifting means 38 for lifting one or more bins 10 from the stack 12 to access the required products.

The body of the vehicle 32 comprises a cavity 40, the cavity 40 being sized so as to hold a storage bin 10. The lifting means 38 preferably comprises winch means and a storage bin 10 gripper assembly 39. The lifting means 38 lifts a storage bin 10 from the stack 12 to within the cavity 40 in the body of the vehicle 32.

In this way, using a plurality of robotic load handling devices 30 on a grid-based storage system allows multiple products to be accessed from multiple locations in the grid and stacks 12 at any one time.

A first embodiment of an order picking system in accordance with one form of the invention is shown in FIGS. 7a, 7b and 7c. As can be seen in FIG. 7a, the first embodiment comprises a pick aisle 100 in which the storage area 102 comprises presentation positions 116 in which storage bins 10 are located to create a pick face 118.

In the context of one example of order picking system in accordance with one form of the invention, and with reference to FIGS. 7a, 7b and 7c, a robotic load handling device 30 removes a storage bin 10 containing inventory items 28 required for picking in to customer orders therein from a stack 12. The load handling device 30 transports the said required storage bin 10 to an output port 130 as shown in more detail in FIG. 7b. At the output port 130, the storage bin 10 is lowered by the load handling device 30 to a landing portion 132 in a pre-pick position 126.

As shown in FIG. 7b, the pre-pick position 126 in to which the storage bin 10 is lowered will depend on the presentation position 116 for which the storage bin 10 is ultimately destined. Typically, there are three presentation positions 116 in substantially positioned in column-like placements along the pick face 118 although it will be appreciated that this is dependent on the size of the storage bins 10, larger storage bins 10 may result in fewer presentation positions 116 on the pick face 118 and smaller storage bins 10 may result in a larger number of presentation positions 116 on the pick face 118. Furthermore, the arrangement of the presentation positions 116 may depend on the drop off locations and the arrangement of landing portions 132. Any suitable arrangement of presentation positions 116 suitable to achieve the required throughput of storage bins 10, in the particular context of the picking system, at the pick aisle 100 may be envisaged.

As shown in more detail in FIG. 7b, in order for the pre-pick positions 126 for the presentation positions 116 not to impinge on storage bins 10 being lowered by alternative load handling devices 30 to other pre-pick positions 126, a staggered set of pre-pick positions 126 may be required. Advantageously, this can ensure that 'faster moving' inventory items 28—namely those more frequently ordered by customers or those of which customers typically order a plurality—are continually and regularly placed in the pre-pick position 126 in order for a swift replacement to be possible when the storage bin 10 in the presentation position 116 is empty. Although as previously described, the same items or products need not be in each of the storage containers 10 in the pre-pick positions 126.

As shown in more detail in the simplified side view of FIG. 8a, each pre-pick position 126 comprises a landing portion 132 on to which the load handling device 30 lowers the storage bin 10. The landing portion 132 comprises a device acting as means for moving the storage bin 10 from the dropped position, in a substantially lateral direction, in a controlled manner, toward the presentation position 116 as and when required by the operative 120 in the pick aisle 100. It will be appreciated that there are many ways in which the skilled person may achieve this objective and the following examples are not to be considered limiting, any suitable form of mechanism may be used to fulfil this function.

One form of moving device may comprise a driven roller conveyor section 133 located at the landing portion 132 as shown in FIG. 7b. The driven conveyor 133 may comprise a series of rollers powered such that on activation of the driver, any storage bin 10 in position on the landing portion 132 will move under the control of the driven conveyor section 133 into the next pre-pick storage position 126 or in to the presentation position 116.

It will be appreciated that the conveyor section 133 may be driven by a motor or any other suitable form of driver, but may also be manually activated by a lever, crank or other mechanical device, under the control of the operative 120.

The conveyor section 133 may further comprise a bin stop (not shown). The bin stop acts so as to prevent the movement of the storage bin 10 from the landing portion 132 in to pre-pick positions 126 or in to the presentation position 116. The bin stop may be under the control of the computer control utility, thereby enabling the system to control the movement of the storage bins 10 in to presentation positions 116 only once previously depleted storage bins 10 in the presentation positions 116 have been moved by the operative.

Each output port 130 comprises a grid space defined by the tracks or rails 22 in the grid-based storage area 102. Beneath the output port 130 is a column of the storage area 102 not populated with stacks 12 of storage bins 10 that acts as a column 131 down which the load handling device 30 lowers the or each storage bin 10 required to be delivered to the pick face 118. The output column 131 further comprises sensor means (not shown) to detect the presence or absence of the lifting device 38 and or the storage bin gripper assembly 39 in the output column 131. The output column further comprises sensor means (not shown) in the vicinity of the landing portion 132 to detect the presence or absence of a storage bin 10 on the landing portion 132.

In use, the system of FIGS. 7a, 7b and 7c operates as follows. A robotic load handling device 30 is controllably moved in to position above a stack 12 of storage bins 10 in which the top storage bin 10 contains items required to be picked in to a customer order in an online retail environment. The robotic load handling device 30 lowers the lifting device 38 and the storage bin 10 gripper assembly 39 engages with the storage bin 10 in the top position in the stack 12. The lifting mechanism 38 is reeled in and the storage bin 10 is moved upwardly off the stack 12 and lifted in to the cavity in the body 32 of the robotic load handling device 30. Once the storage bin 10 is fully within the body 32, the robotic load handling device 30 is moved under the control of the computer control utility to the output port 130.

Once positioned at the output port 130, above the output column 131, the robotic load handling device 30 lowers the storage bin 10, substantially reversing the storage bin 10 lifting process, the lifting device 38 lowering the storage bin 10 until located on the landing portion 132. Sensors (not shown) in the output column 131 in the vicinity of the landing portion 132 detect the presence of the storage bin 10 on the landing portion 132 and the bin gripper 39 disengages from the storage bin 10. Once disengaged, the bin gripper 39 is reeled back in to the body 32 of the load handling device 30. The movement of the bin gripper 39 is monitored by further sensors (not shown) in the output column 131 to ensure the load handling device 30 is fully disengaged from the storage bin 10. If the storage bin 10 is detected on the landing portion 132 and the bin gripper 39 is detected as disengaged from the storage bin 10, the computer control utility can act on so as to drive the driven conveyor section 133 to move the storage bin 10 in to a presentation position 116 or a further pre-pick storage position 126 dependent on the output column 131 in to which the storage bin 10 has been deposited.

It will be appreciated that the driven roller conveyor section or sections 133 are under the control of the computer control utility (not shown), the conveyor section or sections 133 only being powered when the storage bin 10 is in position on the landing portion 132. The bin stop acting to prevent movement of the storage bin 10 before the subsequent storage bin 10 position 116, 126 is free to accept the storage bin 10.

Once the required storage bin 10 is in the required presentation position 116 of the pick face 118, the operative 120 may pick items therefrom in to delivery containers DT present on the station conveyor 108a at the pick station 114a in the pick aisle 100. The delivery container DT comprising the picked item may then be moved along the station conveyor 108a and merge on to the backline conveyor 106 via the merge 112. The said delivery container DT may then be moved to other pick aisles 100 via conveyor connections (not shown) and onward to other pick stations 114 within the CFC.

Once the required items fulfilling the customer order, or a part of the customer order, have been picked therein, the delivery container DT is routed under the control of the computer control utility to a dispatch area (not shown) for loading and dispatch to a customer.

It will be appreciated that the presentation positions 116 comprise storage bins 10 at all times unless being replenished by a storage bin 10 from the "pre-pick" positions 126.

However, in order for storage bins 10 comprising inventory items or products to replace storage bins 10 having been emptied by operatives 120, the empty storage bin 10 must be manually removed by the operative 120. The empty storage bins 10 may be manually collected by further operatives 120 and moved to an input port (not shown) of the storage area where further inventory items or products can be manually or robotically placed therein.

Alternatively the storage bins 10 removed from the presentation locations 116 once the inventory items or products therein are depleted may be placed on the station conveyor 108 and or the backline conveyor 106 for removal to a remote location wherein the storage bins 10 are retuned in to the storage area 102 for re-filling or other use. In a further form of the invention, a further conveyor may be located, for example above the station 108 and or backline conveyor 106 or above the pick face 118, to remove empty storage bins 10 to said remote collection point (not shown).

However, it is an advantage of such grid-based order picking and storage systems that the storage bins 10 remain captive in the system. Manual movement of the storage bins 10 may need to be avoided as damage may be caused or cleaning may be required.

Accordingly, in another aspect of the first embodiment of the invention the pick face 118 is provided with input locations in to the storage area 102. The input locations comprise empty presentation locations 116 in the pick face 118 where an operative 120 may place an empty storage bin 10 on a moving device acting so as to move the empty storage bin 10 from the presentation position 116 to an empty pre-pick position 126 and again to a landing portion 132. Once the empty storage bin 10 is in position on the landing portion 132 a robotic load handling device 30 can be moved under the control of the computer control utility, to pick up the empty storage bin 10 and reel said bin 10 in to the body of the load handling device 30. The load handling device 30 may then be moved to a position where the empty storage bin 10 is required or can be refilled with inventory items or products.

It will be appreciated that this is the reverse process of routing the storage bin 10 comprising inventory items or products to the presentation position 116. However, given the number of inventory items or products in each storage bin 10 in the presentation positions 116 in the pick face 118, there will be a slower turnover of empty storage containers 10. Accordingly, fewer reverse input presentation positions will be required along the length of the pick aisle 100. There may be as few as 1 input presentation position for every 30 output presentation positions 116.

In a further form of the first embodiment of the invention, the delivery containers DT located at the pick stations 114 may be input in to the storage area once items required have been picked therein. In the same manner that empty storage bins 10 may be returned in to the storage area via reverse presentation positions 116, delivery containers DT may be placed in storage bins 10 and input to the storage area for later assembly of a full customer order. In this way, customer orders may be part picked and stored in the storage area within delivery containers DT within storage bins 10 in stacks 12.

It will be apparent to a skilled person in the art that the moving conveyor sections 133 need not comprise driven roller conveyor section 133 but may comprise driven belt conveyors. It will be appreciated that any other suitable form of driven conveyors may be used capable of moving storage bins 10 under control of a computer control utility in an order picking and storage system.

In a further form of the first embodiment of the invention, as shown in FIG. 7c, the pick aisle 100 comprises operatives 120 moving trolleys 134 along the pick aisle 100 instead of a conveyor 106, 108 and pick station 114 arrangement. The trolleys 134 comprise a plurality of delivery containers DT capable of being moved by the operative along the pick aisle 100 in front of the pick face 118. In this form of the embodiment of the invention, the operative 120 is provided with a computer controlled display and scanning device, the device comprising item location information relating to a given customer order and predetermined delivery container DT position information.

It will be appreciated that the computer and/or scanner may of any suitable form or configuration suitable for the purpose and many forms are such device would be known to a person skilled in the art for implementation in such a system as described herein. The computer device may be trolley mounted and may use voice synthesis and voice recognition technology but need not be so configured, any suitable configuration for the purpose may be envisaged.

In use, the operative or operatives 120 position the trolley 134 adjacent a presentation position 116 from which an item is required as instructed by the computer controlled device. The or each operative 120 picks the item from the storage container 10 in the appropriate presentation position 116, scans the item, and places the item in to the delivery container DT on the trolley 134. The operative may also be required to scan the delivery container DT on placing the scanned item in to the predetermined delivery container DT so as to ensure the correct item is in the correct delivery container DT.

The operative 120 then moves along the pick aisle 100 repeating the process until all items required from the given pick aisle 100 are picked in to the appropriate delivery containers DT on the trolley 134. The operative 120 may then continue to other pick aisles 100 within the CFC and moved there through as required. Once all the required items have been picked to fulfil the portions of the customer order comprising the delivery containers DT on the trolley 134, the trolley 134 is moved to dispatch for unloading and onward transit to customers.

Alternatively, the completed delivery containers DT may be placed in to storage bins 10 and placed in to the grid-based storage area 102 for future picking, combination with other related delivery containers DT for a given order, or dispatch. The nested storage bins 10 and delivery containers DT may be routed via any of the conveyor means described above to a remote location for manual, automated or robotic replacement in the system.

It will be appreciated that in any given CFC operation, a combination of conveyor pick aisles 100 and trolley 134 pick aisles and operatives 120 may be used to fulfil all or part of customer orders.

It will be appreciated that, in the first embodiment of the invention, the use of the grid-based storage area 102 enables all presentation positions 116 in all pick aisles 100 to be serviced at all times. Failure of a load handling device 30 will not stop the system operating, unlike typical storage areas 102 currently serviced by crane devices 124.

A second embodiment of the invention will be described with reference to FIGS. 8a, 8b and 8c. Items referenced in the systems described above both in the preamble and the first embodiment of the invention will retain the same reference numerals.

FIG. 8a shows a perspective schematic view of an alternative form of storage area 102 located in a pick aisle 100 of a CFC. The conveyors 106, 108, the pick stations 114 and the order assembly area are as described with reference to FIGS. 7a and 7b or alternatively the trolley pick solution of FIG. 7c may be envisaged.

The storage area 102 of the second embodiment remains of the grid-based type, comprising stacks 12 of storage bins 10 located within a framework 14, the framework 14 comprising uprights 16 supporting a grid structure located above the stacks 12. Load handling devices 30 operate on tracks 22 mounted on the grid structure of the framework 14. The grid structure defining grid spaces within which the footprint of a stack 12 of storage bins 10 will fit.

In common with the first embodiment, the framework 14 further defines a number of output ports 130 and output columns 131 down which storage bins 10 may be lowered by the lifting device 38 and bin gripper device 39 of the load handling device 30.

In the second embodiment of the invention, the output column 131 again comprises a series of landing portions 132. However, in the second embodiment of the invention the landing portions 132 comprise roller conveyor sections 233. The roller conveyor sections 233 of the second embodiment are not powered or driven. The roller conveyors 233 comprise a series of rollers 234 mounted on a substructure 236. The rollers are free to rotate when located in the substructure 234.

As can be seen in FIGS. 8a and 8b, each output port 130 and output column 131 associated with a given presentation position 116 comprises a different number of roller substructures 236, again the staggered number of landing positions 132 is defined by the number of presentation positions 116 required in the pick face 118. The specific numbers of landing portions 132 and output ports 130 and columns 131 may be different than shown and described in the present example.

The substructure 236 of the landing portion 132 is located within the output column 131 in a similar manner to that described previously with reference to the first embodiment of the invention. Each landing portion 132 comprising the substructure 236 when in situ within the output column 131 is located in a substantially horizontal position with reference to the uprights of the framework 14 of the storage area 102 when there is no storage bin 10 located thereon. As shown in FIG. 8b the uppermost landing portion 132 absent a storage bin 10 comprises a substructure 236 positioned in a substantially horizontal manner within the output column 131 and relative to the uprights of said column 131.

It will be noted that the remaining landing portions 132 in FIG. 8b comprise storage bins 10 located on the rollers of the substructure 236. However, substructures 236 occupied, with storage bins thereon, are at an angle relative to the horizontal. Whilst not to scale in the drawings, the angle may be 5 degrees from the horizontal but it will be appreciated that any angle suitable for the required purpose may be used.

The substructure 236 further comprises two guide uprights 238 mounted on said substructure 236 substantially perpendicular to the base of the substructure 236. The guide uprights 238 extend from two corners of the short side of the substructure 236 upwardly, substantially parallel to the framework uprights 14 of the framework 14 in the output columns 131 of the storage area 102. The guide uprights 238 are positioned on the substructure 236 of the landing portion 132 so as to guide a storage bin 10 lowered thereon. The guide uprights 238 extend upwardly from the substructure and are sized so as to be taller than the height of a storage bin 10 in use in the system.

The substructures 236 of the landing portions 132 are pivotally mounted within the output column 131. In this way the landing portions are free to tip downwardly toward the presentation positions 116 by a predetermined angle.

Each landing portion 132 is provided with a storage bin 10 stop device 240. The bin stop device 240 is rotatably mounted on each of the landing portions 132 and the presentation portions 116, beneath the rollers mounted in the substructure 236. The bin stop device may comprise a substantially vertically extending member 242 capable of protruding between the rollers mounted in the substructure 236. The bin stop device 240 may further comprise a longitudinally extending portion (not shown) beneath the rollers connected to the vertically extending member 242, the longitudinally extending portion being pivotally mounted on the substructure 236. In the present embodiment, the bin stop 240 is substantially L-shaped. One of the rollers (not identified) in the roller bed mounted in the substructure 236 is spring loaded within the substructure 236 and when forced down by the presence of a storage bin 10 on the bed of rollers acts so as impinge on the longitudinally extending portion of the bin stop device 240 underneath the rollers. The bin stop device 240 may move from a first position where the vertically extending member 242 protrudes through the rollers to a second position where the vertically extending member 242 is beneath the uppermost surface of the rollers. There may be a mechanical advantage such that a small movement in the roller is magnified to a larger movement of the vertically extending portion 242. Movement of the spring mounted roller under the force of a storage bin 10 on the rollers, pivots the longitudinally extending member such that the vertically extending portion 242 protrudes through the rollers.

In use, with reference to FIGS. 8a, 8b and 8c, a storage bin 10 is transported to the output port 130 as described above with reference to the first embodiment of the invention.

The storage bin 10 is lowered by the lifting means 38 of the load handling device 30 down the output column 131. As the storage bin 10 approaches the landing position 132 the storage bin 10 begins to engage the guide uprights 238 of the substructure 236. The lifting means 238 continues to lower the storage bin 10 until the storage bin 10 is in position on the rollers rotatably mounted on the substructure 236. Once in this position, the gripper assembly 39 of the lifting device 38 is disengaged from the storage bin 10 and is reeled back in to the load handling device 30.

As the gripper device 39 disengages and is moved upwardly, it passes the uppermost part of the guide uprights 238. Once the gripper device 39 passes this uppermost part of the guide uprights 238, the substructure 236 is free to pivot from the substantially horizontal position by downwardly toward the presentation positions 116.

As the rollers mounted within the substructure 236 are free to rotate, the storage bin 10 will move toward the presentation position 116 under the weight of the storage bin 10, under gravity.

In the case of the uppermost landing position 232 and presentation position 116 in FIG. 8b, once the storage bin 10 is in situ on the substructure 236 of the landing portion 132 and the gripper device 39 of the load handling device 30 has been retracted, the substructure 236 will tip downwardly at the end adjacent the presentation position 116, and the storage bin 10 will move under gravity in to the presentation position 116.

As there is no storage bin in the uppermost presentation position 116 of the pick face 118 in this example, the bin stop device 240 does not operate and the storage bin is free to roll forward on the rollers from the landing position 132 in the pre-pick position 126, to the presentation position 116a.

With reference to the second layer of storage bins 10 in the pre-pick positions 126 of FIG. 8b, the presence of a storage bin 10 in the presentation position 116 acts so as to activate the bin stop device 240.

Movement of the spring loaded roller under the force of a storage bin 10 on the rollers of the presentation portion 116, pivots the longitudinally extending member beneath the rollers, such that the vertically extending member 242 of the bin stop device 240 protrudes through the rollers at a position on the roller bed adjacent the first pre-pick position 126b, thereby preventing the storage bin 10b' from rolling under gravity in to the storage bin 10 in the presentation position 116b. In a similar fashion, the presence of a storage bin 10b' in the pre-pick position 126b activates the bin stop 240 in the substructure 236 of the roller conveyor section in the pre-pick position 126b. The activated bin stop 240 prevents the storage bin 10b'' from rolling under gravity from the landing portion 132b in to the storage bin 10b' in the pre-pick position 126b.

From the above and with reference to FIGS. 8b and 8c, it will be appreciated that the presence of a storage bin 10 on any roller conveyor section 133 activates the bin stop device 240 and prevents the next storage bin 10 in the system from moving under gravity in to the next position in the system.

It will be appreciated that the use of a bin stop device 240 in this way is required as manual removal of the storage bin 10 in the presentation position 116 in the absence of the pre-pick storage bins 10 being stopped by the bin stop device 240 may require excess force.

Furthermore, on removal of the storage bin 10 in the presentation position 116 any storage bins 10 not stopped may move quickly under gravity and could cause damage or injury to the operative 120 or to the items and products in the storage bin 10.

It will be appreciated that the bin stop device 240 described above with reference to FIGS. 8b and 8c is only one form of bin stop mechanism that may be used and any other mechanical, electromechanical, magnetic or any other suitable form of bin stop device capable of stopping the movement of bins on gravity fed roller conveyor sections may be used.

It is an advantage of the second embodiment of the invention that the system for moving storage bins 10 from the point at which they are deposited by the load handling devices 30 to the presentation positions 116 requires no power and is a relatively simple and effective mechanical system. This removes complexity from the system and removes the need for the computer control utility to be controlling the precise movement of the storage bins 10 towards the pick face 118.

It will be appreciated that in common with the first embodiment described above, empty storage bins 10 may be input to the system at specially configured presentation positions 116 that act in the same manner to that described above with reference to storage bins 10 being fed in to the presentation positions 116. Whilst a mechanical system could be envisaged. It would be also possible for the input positions to be powered in the manner descried with reference to the first embodiment. Again, fewer input positions would be required compared with the number of output presentation positions 116.

Again, it will be appreciated that the conveyor-based order assembly area 104 may be replaced with the trolley 134 pick solution described with reference to FIG. 7c of the first embodiment, the use of the trolley pick aisles remaining as described above.

A third embodiment of the invention will be described with reference to FIG. 8d. Items referenced in the systems described above both in the preamble and the first and second embodiments of the invention will retain the same reference numerals.

The third embodiment of the invention comprises an alternative form of output column 331 and method of operation thereof.

The output column 331 of the third embodiment comprises a bin lift device 300. The bin lift device 300 is operable within the output column 331 and services all the presentation positions 116 of the pick aisle 100.

The bin lift device 300 comprises a landing portion 332 comprising a section of powered conveyor 304. The bin lift device 300 moves up and down the output column 331 under the control of the computer control utility (not shown). The bin lift device 300 may comprise any suitable form of lift device capable of receiving storage bins 10 delivered by load handling devices 30 and transporting said storage bins 10 to presentation positions 116 of the pick face 118 of the storage area 102 of the pick aisle 100.

In use, the load handling device 30 lowers a storage bin 10 through the output port 30 in to the output column 331. The bin lift device 300 may be moved upwardly within the column to meet the storage bin 10 being lowered by the load handling device 30.

The storage bin 10 is deposited on the landing portion 332 of the lift device 300 and the bin gripper 39 of the lifting means 38 is disengaged from the storage bin 10 and retracted in to the body 32 of the load handling device 30.

Once the storage bin 10 is in situ on the landing portion 332 of the bin lift device 300, the bin lift device 300 is moved to be adjacent the presentation position 116 of the pick face 118 of the pick aisle 100 in the CFC. The driven roller conveyor of the landing portion 332 of the bin lift device 300 is activated so as to drive the storage bin 10 from the bin lift device 300 in to the presentation position 116. Once the storage bin 10 is in situ in the presentation position 116, the bin lift device 300 may move to the top of the output column 331 in order to receive another storage bin 10.

In this way, a single bin lift device 300 is operable in each output column 331 of the pick face 118 again avoiding a single point of failure, but wasting less storage space with pre-pick positions 126.

It will be appreciated that this the case of the third embodiment, a single output column 331 could service the presentation positions 116 of two pick aisles, one on either side of the column 331. Furthermore, it would be possible for a single output column to service multiple levels of pick aisles 100. For example, in one form of the third embodiment of the invention, two pick aisles 100 are located on a ground floor and two pick aisles 100 are located on a mezzanine level immediately above. It will be appreciated that the grid-based storage system may be positioned on the ground floor whilst extending upwardly over many floors. In this case, a single output column 331 could service the presentation positions 116 on both the ground floor and the mezzanine level, the system having a pick face 118 on each floor.

It will be appreciated that a bin lift device 300 will be required in any output column 331 having presentation positions 116 therein.

In another form of the invention with reference to FIGS. 8e and 8f, the bin lift device 300 present in each output column 331 as described above, is replaced with a series of shuttle devices 310. Each shuttle device 310 is moveable around a frame 340, the frame 340 being interposed between the uprights of the output columns 331 as shown in FIG. 8f.

The frame 340 comprises two tracks, each track comprising a first portion 342 substantially horizontal and extending longitudinally along the base of the output columns 331, and a second portion 344 substantially horizontal and longitudinally extending along the underside of the rails or tracks on which the load handling devices 30 are operative.

The first and second track portions 342 and 344 are linked by a plurality of substantially vertically extending track sections 346, the number of substantially vertically extending track sections 346 matching the number of uprights in the output columns 331. In this way, the pitch of the substantially vertical track sections 346 substantially matches the pitch of the uprights of the output columns 331.

The frame 340 is disposed between the uprights of the output columns 331 so as to create a framework on which a shuttle devices 310 can run.

Each shuttle device 310 comprises a vehicle base 312 the base 312 carrying a section of conveyor 333. Each shuttle device 310 further comprises wheels or any other suitable form of moving mechanism, the wheels or moving mechanism being adapted so as to be moveable along yet captive within or on the tracks 342, 344, 346 of the frame 340.

The track portions 342, 344 and the track sections 346 of the frame 340 may comprise longitudinally extending, grooved, extruded members, the wheels or moving means comprising a geared or wheel mechanism captive in the grooved extruded members.

However, it will be appreciated that there are many ways known to a person skilled in the art of achieving this objective. For example, the tracks or may not be grooved but may be of a c-shaped cross section, the captive wheel mechanism being held in place by the distal ends of the c-shape.

The joints (not shown) between the substantially vertical extending track sections 346 and the substantially horizontal longitudinally extending track portions 342, 344 are adapted so as to allow the wheels or moving means of the shuttle devices 340 to move from a substantially vertically extending section of track 346 to a substantially horizontally extending portion of track 342, 344.

In this way a shuttle device can pass along the base of the output columns 331 of the storage area 102 on the track portion 342, travel upwardly on the track sections 346 within the output columns 331 and along the uppermost track portion 344.

It will be appreciated that the nature of the frame 340 allows for a plurality of shuttle devices to be operable on the frame at any time as it is possible for a shuttle device 340 to pass along the substantially horizontal, longitudinally extending tracks 342 beneath shuttle devices 340 located and operable on the substantially vertical sections of track 346.

In use, a load handling device 30 positioned at the top of the output column 331 lowers a storage bin 10 required for a presentation position 116 associated with the given output column 331, on to the shuttle device 310. Once the storage bin 10 is in situ on the shuttle device 310, the gripper mechanism 39 and lifting device 38 of the load handling device 30 disengage from the storage bin 10 and retract or reel back in to the load handling device 30.

Once the storage bin 10 is disengaged from the gripper device 39, and the gripper device 39 and lifting means 38 are clear of the output column 331, the shuttle device 310 moves in a substantially vertical direction on the section of track 346 within the output column 331 and is paused under the control of the computer control utility at a level corresponding with the presentation position 116 at which the storage bin 10 is required to replace a previously removed storage bin 10.

Once in position, the conveyor 333 on the shuttle device 310 is activated such that the storage bin 10 moves from the device in to the empty presentation position 116.

Once the storage bin 10 is in position in the presentation position 116, the shuttle device 310 may be repositioned to receive the next storage bin 10. It will be appreciated that the next presentation position 116 that may require refilling may be associated with the same output column 331 or may be associated with an alternative output column 331 positioned at a different position in the pick face 118.

In the event that the presentation position 116 is in the same output column, the shuttle device 310 and climbing means 316 act in the manner described above to receive the required storage bin 10 and move it to the required position 116.

In the event that the presentation position 116, to be filled by the delivered storage bin 10, is in a different output column 331, the shuttle device 310 is moved on the track sections 346 in either an upward direction or a downward direction dependent on the position of other shuttle devices and the location of the presentation position 116 to be filled. On reaching either of the substantially horizontally extending track portions 342, 344, the wheel or moving mechanism of the shuttle device 310 engages the relevant portion of the track 342, 344 and is moved under the control of the computer control utility to the base of the output column 331 associated with the presentation position 116 requiring the storage bin 10 to be delivered thereto. Once in position at the base of the required output column 331, the shuttle device 310 engages the track sections 346 and the shuttle device 310 is moved in to the output column 331. The procedure for receiving a storage bin 10 and transferring said bin 10 in to the presentation position 116 as described above is repeated.

It will be appreciated that the shuttle devices 310 are controlled by the computer control utility in common with all of the previously described embodiments and forms of the invention.

In yet another form of the invention, in the context of the present embodiment, as shown in FIGS. 8g and 8h, the bin lift device 300 of FIG. 8d is again replaced by a shuttle device 310. The shuttle device 310 comprises a vehicle base 312 the base 312 carrying a section of driven conveyor 333. The shuttle device 310 is mounted on a substantially horizontal, longitudinally extending rail or track 313 running substantially parallel to the pick face 118 at the base of the storage area 302, the longitudinally extending rail or track 313 passing beneath the base of the uprights 16 bounding the output column 331 of the grid-based storage area 102.

The shuttle device 310 further comprises wheels 314, or any other suitable form of moving means, adapted so as to allow movement of the shuttle device 310 in both directions along the longitudinally extending rail or track.

The shuttle device 310 further comprises climbing means 316 adapted so as to allow the shuttle device 310 to ascend the output column 331. The climbing means 316 may take any suitable form enabling movement of the shuttle device 310 in the substantially vertical direction up and down the output column 331 and enabling the shuttle device to pause at positions within the output columns 331 corresponding to the presentation positions 116.

It will be appreciated that the climbing means 316 may be integral with the shuttle device 310 or may take the form of a separately functioning lift device on to which the shuttle device 310 is maneuvered, the separate lift device running up and down the output column 331 and pausing at the presentation positions 116.

In use, the shuttle device 310 is moved under the control of the computer control utility along the longitudinally extending rails or tracks to the base of an output column 331. Once in position at the base of a desired output column 331, the climbing means engages the uprights of the output column 331 and is moved under the control of the computer control utility in an upward direction.

As previously described above with reference to the system of FIGS. 8e and 8f, a load handling device 30 positioned at the top of the output column 331 lowers a storage bin 10 required for a presentation position 116 associated with the given output column 331 on to the shuttle device 310. The gripper mechanism 39 and lifting device 38 of the load handling device 30 is then disengaged and retracted or reeled back in to the load handling device 30. Once the storage bin 30 is disengaged from the gripper device 39, the shuttle device 310 moves in a vertical direction, downwardly and is paused under the control of the computer control utility at a level corresponding with the presentation position 116 at which the storage bin 10 is required to replace a previously removed storage bin 10.

Once in position, the conveyor on the shuttle device 310 is activated such that the storage bin 10 moves from the device in to the empty presentation position 116. Once the storage bin 10 is in position in the presentation position 116, the shuttle device 310 may be positioned to receive the next storage bin 10.

It will be appreciated that the next presentation position 116 requiring refilling may be associated with the same output column 331 or may be associated with an alternative output column 331 positioned at a different position in the pick face 118.

In the event that the presentation position 116 to be filled by the delivered storage bin 10 is in the same output column, the shuttle device 310 and climbing means 316 act in the manner described above to receive the required storage bin 10 and move it to the required position 116.

In the event that the presentation position 116 to be filled by the delivered storage bin 10 is in a different output column 331, the shuttle device 310 is moved via the climbing means 316 in a downward direction to the base of the output column 331. Once at the base of the output column 331, the shuttle device 310 engages the longitudinally extending rail or track 313 and is moved under the control of the computer control utility to the base of the output column 331 associated with the presentation position 116 requiring the storage bin 10 to be delivered thereto. Once in position at the base of the required output column 331, the shuttle device 310 engages the uprights of the output column 331 and the procedure above is repeated.

It will be appreciated that in the embodiments described with reference to any of FIGS. 8d, 8e, 8f, 8g, and 8h, the conveyor 333 on the shuttle devices 310 may be driven roller conveyor or driven belt conveyor and may be powered by any suitable means.

Using the shuttle device 310 in the manner described in any of the embodiments described with reference to FIGS. 8d, 8e, 8f, 8g and 8h enables a plurality of columns to be serviced by a single shuttle device 310.

It will be appreciated that, as shown in FIGS. 8e, 8f, 8g and 8h a plurality of shuttle devices 310 may be able to operate on the longitudinally extending rails or tracks as one shuttle device 310 can pass beneath a shuttle device 310 in position in an output column 331.

It will further be appreciated that longitudinally extending rails or tracks 318 may also run the length of the pick face 118, at the top of the output columns 331, substantially parallel to the rail or track 313 at the base of the storage area 302. It will be noted that only a single rail or track 313 is required at the base of the output columns 331, however at the top of the output columns a pair of rails or tracks 318 will be required in order that the shuttle devices 310 and the rails or tracks 318 on which they run do not impinge on the action of the load handling devices 30 and the movement of the storage bins 10.

In this way it is possible for the shuttle devices 310 to pass up and down the output columns 331 and also pass up one output column 331, across the top of the said output column 331, beneath the level of the surface on which the load handling devices 30 are operable, and along the underside of said surface to a further output column 331 and down said output column 331. It will be appreciated that in order to achieve this the shuttle device 310 comprises at least one retaining mechanism adapted so as to engage with the bottom longitudinally extending rail or track 313, the uprights of the output columns 331 and the rails or tracks 318 running longitudinally along an upper portion of the output columns 331.

As described above with reference to FIGS. 8e and 8f said rails or tracks 313, 318 may comprise longitudinally extending, grooved, extruded members, the retaining mechanism comprising a geared or wheel mechanism captive in the grooved extended members until the handover point between the substantially vertically extending uprights of the output columns and the substantially horizontal rails or tracks 313, 318. However, it will be appreciated that there are many ways known to a person skilled in the art of achieving this objective. For example, the tracks or rails 313, 318 may not be grooved but may be of a c-shaped cross section, the captive wheel mechanism being held in place by the distal ends of the c-shape.

In this way fewer shuttle devices 310 are required than the number of output columns 331 in the pick face 118. For example, it may be possible for one shuttle device to cover 10 or more output columns 331. However, the number of shuttle devices 310 required will depend on the turnover of storage bins 10 in presentation positions 116.

In a modified yet simplified form of the embodiment described with reference to FIGS. 8g and 8h the longitudinally extending rail or track 313 carries a plurality of shuttle devices 310, the shuttle devices 310 moveable along the track 313 along the base of the output columns 331, extending substantially parallel to the pick face 118. The shuttle devices 310 comprise a lift device and a bin receiving portion 132, the bin receiving portion 132 further comprising transferring means.

In use, a storage bin 10 is lowered by the load handling device 30 on to the bin receiving portion 132. The shuttle device 310 is moved along the track 313 under the control of the computer control utility to the base of the output column associated with the presentation portion 116 requiring the storage bin 116 to be placed thereon. Once in position at the base of the relevant output column 131, 331 the lift device is activated so as to lift the storage bin 10 receiving portion 132 to the level of the predetermined presentation position 116. Once the storage bin 10 is at the required level within the output column 131, the transferring means is activated so as to move the storage bin 10 from the bin receiving portion in to the presentation position 116 or the pre-pick storage position 126 or in to the additional storage position 128.

It will be appreciated that the transferring means may be of any suitable form to fulfil the function described and may be of the form of any of the transferring mechanisms described above with reference to any of the other embodiments of the invention or forms thereof.

It will be apparent to a person skilled in the art that there are many ways of achieving the above results and that any suitable mechanism for achieving the objective may be envisaged.

Advantageously, with reference to all the embodiments of FIGS. 7 and 8, in the case of a single shuttle device 310 or bin lift device 300 malfunctioning there will be other shuttle devices 310 or bin lift devices 300 in situ capable of taking over. Additionally, with reference to the simplified embodiment described above, it may be possible for a malfunctioning shuttle device 310 to be pushed or pulled out of the way by a functioning shuttle device 310. In this way, there is no single point of failure in replenishing the presentation positions 116 in the pick face 118.

In an alternative form of this embodiment, storage locations 126 as described with reference to the previous embodiments may be disposed between the bin lift device 300 and the presentation positions 116. Such additional storage positions 126 may be provided on one or both sides of the bin lift device 300.

Further forms of the invention are shown in FIGS. 9, 10 and 11. Items referenced in the systems described above both in the preamble and the first and second embodiments of the invention will retain the same reference numerals. It will be appreciated that these forms of the invention may be combined with any or all of the above embodiments and all alternatives referenced therein to provide maximum flexibility in large CFC operations in online retail environments.

FIG. 9 shows a further form of the invention comprising a pick aisle 100 positioned within a grid-based storage area 102. In this form of the invention, the storage area 102 comprises distinct areas 402a and 402b either side of the pick aisle 100.

The storage area 402 in all other respects, is as described in any of the above previously described embodiments.

The storage area 402a comprises a storage area capable of pallet-sized storage. The load handling devices 400 are sized and configured so as to be able to pick up, move and deposit pallets of predetermined and standard sizes adjacent the pick aisle 100. Larger items or items delivered to the CFC by suppliers in bulk and on pallets are stored within the specially configured grid-based system 402a.

In use, items required at the pick stations 114 that are stored within the storage area 402b are picked from the relevant presentation portions 116, having being delivered to the presentation positions 116 in any of the ways described above.

In use, items stored in the pallet section of the storage area 402a are handled in a similar fashion to those in the storage area 402b, with the exception that there are no presentation portions 116. Items or products located on pallets are delivered directly to the pick aisle 100 where an operative 120 on the opposite side of the pick station 114 can break down the pallet and pick items from the pallet in to temporary storage areas (not shown) at the order assembly area 104. Such temporary locations at pick stations are described in Patent No. GB 2,524,383 B1 dated 5 Dec. 2016 (Ocado Innovation Limited) incorporated herein in its entirety by reference.

Advantageously, use of a pallet-sized, grid-based storage system and storage area 402a enables items to be stored and accessed without a lengthy decant process being required to break down items and products on pallets and put them in storage bins 10 and into the system 102. However, not all items are delivered on pallets so both systems are required and can advantageously be combined in the above manner.

FIG. 10 shows a further form of the invention comprising a pick aisle 100 positioned within a grid-based storage area 102. In this form of the invention, the storage area 102 comprises distinct areas 502, 502a and 502b each distinct area comprising a separate area of grid-based storage system separated by dividers or crash barriers 504. In this form of the invention, the distinct areas 502, 502a and 502b comprise differently sized storage bins 10, 10a and 10b. With reference to FIG. 10, the order picking system works in exactly the same manner as described above with reference to the preceding embodiments. The difference is only that the presentation positions are sized so as to accept storage bins 10 of different distinct sizes. It will be appreciated that in the example described herein, there are three sizes of storage bin 10, 10a and 10b. Storage bin 10 is a bin of similar size to that described above; storage bin 10b has a footprint with a cross-sectional area the size of an integer number of storage bins 10; and storage bin 10b has the same footprint as the storage container 10 but is taller. Again it will be appreciated that these are just some of the sizes of storage bins 10 that may be used but this form of invention is not limited to these sizes.

A storage system of this form having multiple different sized robotic load handlers and storage bins 10 is described in GB Patent No GB 2,528,573 B1 dated 8 Feb. 2017 (Ocado Innovation Limited) the contents herein incorporated by reference in entirety.

In all other respects, the order picking system, and specifically the storage area 502 within the order picking system operates in substantially the same manner as that described above with reference to the other embodiments of the invention.

FIG. 11 shows a further form of the invention in which multiple pick aisles 100 on different levels are serviced via a single grid-based storage system. Again, the order picking system operates in the same manner as described with reference to the embodiments above, and may include the alternatives and other examples described previously.

However, in order to enable the robotic load handlers 30 to deposit storage bins 10 on landing positions 132 on multiple levels it is necessary to stagger the presentation positions 616 on the first level with respect to the presentation positions 616' on the second level.

FIGS. 12 and 13 show further forms of the invention in which the grid-based storage system is provided with a conveyor-based pick aisle 100. In these forms of the invention, the grid-based storage system pick stations 714 are provided within the CFC environment.

With this in mind, FIG. 12 shows an order picking system where the zone pick area including the pick aisle 100 is disposed on one face of the grid-based storage system.

The combination of the zone-pick, pick aisle 100 and the grid-based storage system 102 enables fast moving products and items to be handled in the zone pick area as described in detail above and the slower moving items to be handled in order assembly areas at pick stations 714. At a pick station 714 in accordance with one form of the invention, a storage bins 10 containing items required for a customer order and a delivery container DT designated for the specific customer order are deposited at the pick station 714. The item (or items) required from the storage bin 10 is picked from the storage bin 10 in to the delivery container DT and the storage bin 10 is retrieved by a load handling device 30 and returned to a stack 12 in the storage area 102. The delivery container DT may remain at the pick station 714 awaiting other items, until all items required for the same customer order have been transferred in to the delivery container DT from load handling device delivered storage bins 10.

The faster moving items handled in the manner described above with reference to the various embodiments of the invention are picked in to delivery containers DT at the zone pick aisles 100. The delivery containers DT may then be placed in storage bins 10 and input in to the storage system as previously described above, the entire customer order when assembled across a plurality of delivery containers DT may be sequenced within the storage system for output in a single movement to a dispatch area ready sorted for the required delivery route.

It will be appreciated that empty storage bins 10, or storage bins 10 comprising delivery containers DT, or storage bins comprising delivery containers DT and bags 52, may all be stored within the stacks 12 within the storage area 102. Accordingly, suitable means for inputting such containers or combinations thereof may be used as described above. Alternatively, other forms of input methods will be apparent to a person skilled in the art.

FIG. 13 shows a further arrangement of zone pick system with grid-based system. In this form of the invention, the pick station 714 of the grid-based system is disposed in the system adjacent a zone pick aisle. In this way, the faster moving items and products handled in the zone pick area may be merged with the slower moving items handled in the grid-based pick stations. A single operative 120 may pick from both areas. Alternatively a plurality of operatives may work in a single picking area to assemble a single customer order in a series of delivery containers DT at the pick station 714, the delivery containers DT being stored in storage bins 10 and input in the storage system for sequencing and dispatch at the required time.

It will be appreciated that there may be a large number of storage bins 10 in any given storage system and that many different items may be stored in the storage bins 10 in the stacks 12, each storage bin 10 may contain different categories of inventory items within a single stack 12.

It should be noted that the delivery container DT may be an actual delivery container for onward transmission to the customer or be a bin or container 10 with "post pick" items destined for delivery to somewhere else, for instance to an alternative fulfilment centre. The term delivery container DT is used to distinguish storage bins 10 from delivery containers DT.

It will also be appreciated that the delivery container DT may be contained within a storage bin 10 when stored within the grid-based system to ensure that the robotic load handling devices can handle the movement of all bins or containers whether in the stacks 12 of the main storage system or in a nominal robotic picking area.

Furthermore, the containers, bins or totes used in any of the above-described embodiments of the invention and all forms and variations thereof may be of a 180 degree "stacking and nesting" configuration in which rotation of two similar containers by 180 degrees relative to one another changes the ability of the containers to stack or nest accordingly.

Additionally, the embodiments of the invention and all forms thereof have been described based on the use of open-topped containers, bins or totes. However, it will be appreciated that any suitable form of container, bin or tote may be used. For example containers, bins or totes may be provided with lids (hinged or otherwise) side opening panels or end opening panels or any other form suitable for the described purpose.

Furthermore, it will be appreciated that the storage bins 10 need not be of the configuration shown in the appended Figures. The storage bins 10 may be of rectangular footprint or of square footprint. Additionally, the storage bins 10 are shown in the presentation positions 116 with the short edge leading, to increase the density of packing of the bins 10.

However, a long-edge leading configuration is equally possible.

It will be appreciated that the load handling devices described above may be of the form described in detail in the specific embodiments and the referenced drawings. However, any form of load handling device may be used which may include but not be limited to load handling devices comprising cavities, load handling devices of a cantilever configuration, shuttles, gantry cranes or any other form of load handling device suitable for the function described.

It will further be appreciated that whilst many of the above embodiments are described with reference to a remote or separate robotic picking area, it is possible that the main storage system be used as a robotic picking area at the same time as functioning as a conventional picking and storage system.

In all the embodiments described above, picking of items from storage bins 10 in to delivery containers DT may be performed manually by operatives or may be performed robotically by suitably controlled robotic picking devices.

It will further be appreciated that the picking operation described above need not only apply to the picking of customer orders, the picking operation could be part picking of delivery containers DT or other forms of container, bin or tote for onward transmission to a smaller CFC in a CFC hierarchy, or as part of a supply or delivery network Furthermore, whilst the above system is described with reference to order picking within an online retail operation, specifically online grocery retailing, it will be appreciated that the system may find use in other order picking systems. For example the picking of general merchandise items is envisaged. Furthermore, the systems described could be used in other manufacturing environments where large numbers of parts are required to be accessed regularly, for example in car or vehicle assembly lines.

The invention claimed is:

1. A system for picking items from storage, comprising: a grid-based storage system including a plurality of storage containers configured for containing items to be stored, the storage containers being located in stacks within a framework, the framework defining a face of the storage system, the face includes a plurality of presentation positions arranged in a column-like placement for locating storage containers of the plurality of storage containers on the face such that the items stored in the storage containers are accessible to an item picker, wherein a portion of the framework includes a plurality of output columns remote from the stacks, each output column being configured to receive a storage container of the plurality of storage containers lowered through a respective output port located above the output column, wherein each output column is associated with a respective presentation position and each output column includes transferring means for transferring the storage container lowered into the output column to the presentation position associated with the output column.

2. The system of claim 1, wherein the transferring means is configured to transfer the storage container lowered into the output column towards the presentation position associated with the output column in a substantially lateral direction.

3. The system of claim 2, wherein the transferring means of at least one of the output columns is configured to transfer a storage container lowered into the output column towards the presentation position associated with the output column in a substantially lateral direction via at least one of the other output columns.

4. The system of claim 2, wherein each output column comprises a landing portion onto which a lowered storage container is received, and the landing portions of the output columns are staggered such that the landing portion of a particular output column does not impinge on a storage container being lowered onto the landing portion of any of the other output columns.

5. The system of claim 1, wherein the transferring means comprises a gravity-fed conveyor system.

6. The system of claim 5, wherein the landing portion is configured to pivotally rotate downwards from a horizontal position by a predetermined angle to allow the lowered storage container to move towards the presentation position under gravity.

7. The system of claim 5, wherein each presentation position and/or each transferring means comprises at least one bin stop device configured to stop a storage container at at least one pre-pick position before the presentation position.

8. The system of claim 7, wherein the presence of a first storage container in the presentation position activates the bin stop device to stop a second storage container in an adjacent pre-pick position from moving under gravity to the presentation position.

9. The system of claim 7, wherein the presence of a first storage container at a first pre-pick position activates the bin stop device to stop a second storage container at an adjacent second pre-pick position from moving under gravity to the first pre-pick position.

10. The system of claim 1, wherein the transferring means comprises a driven conveyor.

11. The system of claim 1, wherein the face of the storage system comprises a plurality of presentation positions arranged in a plurality of column-like placements.

12. The system of claim 1, comprising:
at least one load handling device operative on rails or tracks, the rails or tracks being disposed on substantially horizontal members of the framework, the or each load handling device comprising drive means for driving the load handling device from a first position above a stack of storage containers to a second position above an output column, the load handling device including a lifting mechanism for engaging at least one storage container so as to lift the storage container from the stack and lower the storage container into the output column via the output port above the output column.

13. The system of claim 12, wherein the load handling device comprises a cavity, the cavity being adapted so as to receive a storage container.

14. The system of claim 13, wherein the load handling device occupies the footprint of a single grid space in the grid-based storage system.

15. The system of claim 12, wherein the load handling device comprises a cantilever-shaped body.

16. The system of claim 12, comprising:
an order assembly portion comprising delivery containers (DT) into which items are picked from the storage containers in the presentation positions.

17. The system of claim 16, comprising:
an order assembly area associated with the grid-based storage system, wherein items may be picked from storage containers in presentation positions or picked from order assembly areas.

18. The system of claim 15, comprising:
a plurality of order assembly portions located across a plurality of levels of storage system.

19. The system of claim 12, comprising:
further transferring means for returning storage containers removed from the presentation positions back to the storage system.

20. The system of claim 12, wherein the grid-based storage system is configured to store storage containers of multiple sizes.

21. The system of claim 20, wherein the face comprises presentation positions of multiple sizes so as to present the multiple sized storage containers stored within the storage system.

* * * * *